(12) United States Patent
Martinot-Lagarde et al.

(10) Patent No.: US 6,452,573 B1
(45) Date of Patent: Sep. 17, 2002

(54) LIQUID CRYSTAL DEVICE COMPRISING ANCHORING MEANS ON AT LEAST ONE CONFINEMENT PLATE PROVIDING A DEGENERATED ORIENTATION

(75) Inventors: Philippe Martinot-Lagarde, Marcoussis; Ivan Dozov, Gif sur Yvette; Eric Polossat, Montpellier; Eric Raspaud, Gometz le Chatel; Philippe Auroy, Gif sur Yvette; Olivier Ou Ramdane, Paris; Georges Durand, Orsay; Sandrine Forget, Cachan, all of (FR)

(73) Assignee: Nemoptic, S.A., Paris (FR)

(*) Notice: Subject to any disclaimer, the term of this patent is extended or adjusted under 35 U.S.C. 154(b) by 0 days.

(21) Appl. No.: 09/214,432
(22) PCT Filed: May 6, 1998
(86) PCT No.: PCT/FR98/00909
§ 371 (c)(1),
(2), (4) Date: Apr. 16, 1999
(87) PCT Pub. No.: WO98/50821
PCT Pub. Date: Nov. 12, 1998

(30) Foreign Application Priority Data

May 7, 1997 (FR) .............................. 97 05653

(51) Int. Cl.$^7$ ................................. G09G 5/00
(52) U.S. Cl. .............. 345/8; 345/7; 345/9; 345/157; 345/158
(58) Field of Search .................. 345/90, 84, 7, 345/8, 9, 427, 157, 158; 349/155, 123, 128

(56) References Cited

U.S. PATENT DOCUMENTS 5,384,067 A * 1/1995 Doane et al. .............. 349/183
5,492,769 A * 2/1996 Pryor et al. ................ 428/552
5,643,471 A * 7/1997 Onishi et al. ............... 216/23
5,853,818 A * 12/1998 Kwon et al. ................ 427/510

FOREIGN PATENT DOCUMENTS

EP 021 501 A2 4/1994

OTHER PUBLICATIONS

Masuda et al., "A radial Molecular Orientation Using a Flow–Induced Aligning Method in a Nematic Liquid Crystal Cell", Jpn. J. App. Pys., 34:4129–4132 (1995).

Lewis et al., "Hybrid aligned cholesteric: A novel liquid–crystal alignment", Applied Phys. Ltr., 51:1197–1199 (1987).

Marusii et al., "Director turning on isotropic surface due to light–induced torque in a bulk of nematic liquid crystal", Institute of Phys. Nat'l. Acad. Sci., 2795:100–105 (1995).

Jerome, "Surface effects and anchoring in liquid crystals", Reports on Progress in Phys., 54:391–451 (1991).

Matsumoto et al., "Surface–induced molecular orientation of liquid crystals by carboxylatochromium complexes", Applied Phys. Ltr., 27:268–270 (1975).

(List continued on next page.)

Primary Examiner—Mark Zimmerman
Assistant Examiner—Mackly Monestime
(74) Attorney, Agent, or Firm—Frommer Lawrence & Haug

(57) ABSTRACT

The present invention relates to a liquid crystal display device comprising a liquid crystal material sandwiched between two confinement plates (1, 2), the device being characterized by the fact that at least one of the plates (2) is provided with treatment which defines degenerate or nearly degenerate azimuth anchoring without azimuth orientation memory.

51 Claims, 14 Drawing Sheets

OTHER PUBLICATIONS

Cognard, "Alignment of Nematic Liquid Crystals and Their Mixtures", Molecular Crystals and Liquid Crystals Supplement Series, No. 1, pp. 1–74 (1982).

Dozov et al., "Structure of a Hybrid Aligned Cholesteric Liquid Crystal Cell", J. of Phys., 47:373–377 (1986).

Myrvold, "A weak surface memory effect in liquid crystal cells with rubbed polyimide layers", Liquid Crystals, 18:287–290 (1995).

Toko et al., "P–49: TN–LCDs Fabricated by Non–Rubbing Showing Wide and Homogeneous Viewing Angular Characteristics and Excellent Voltage Holding Ratio", SID Int'l. Symposium, Digest of Technical Papers, 24:622–625 (1993).

Ong et al., "Alignment of nematic liquid crystals by inhomogeneous surfaces", J. of App. Phys., 57:186–192 (1985).

* cited by examiner

FIG_1
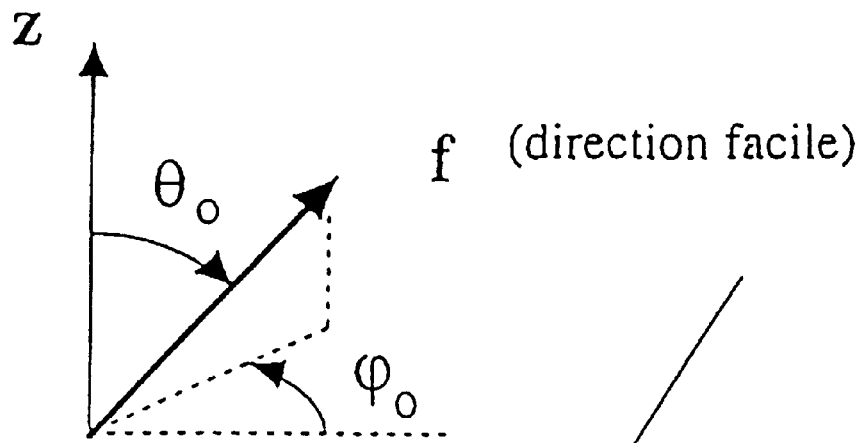
FIG_2
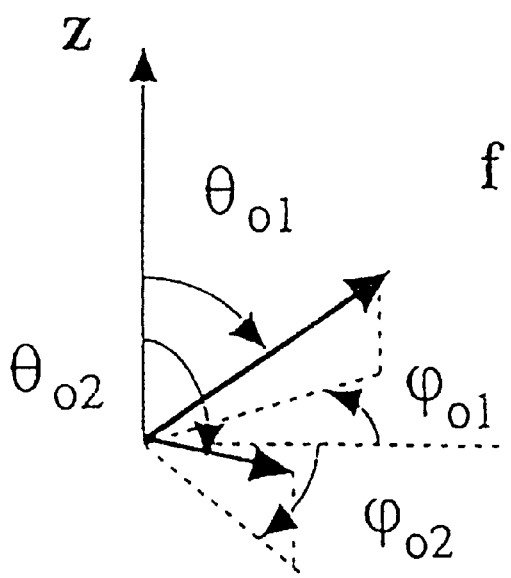

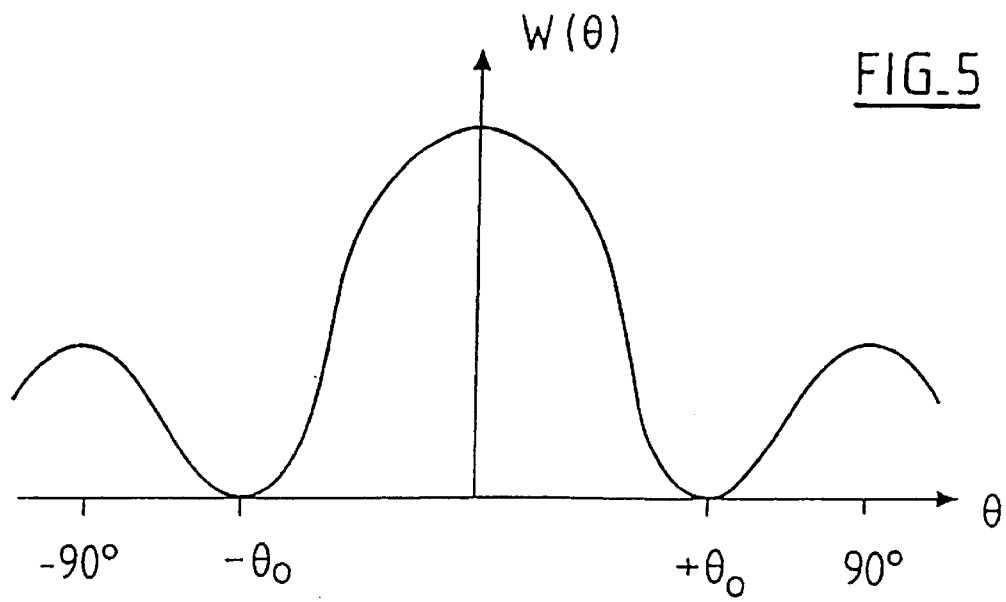
FIG_5
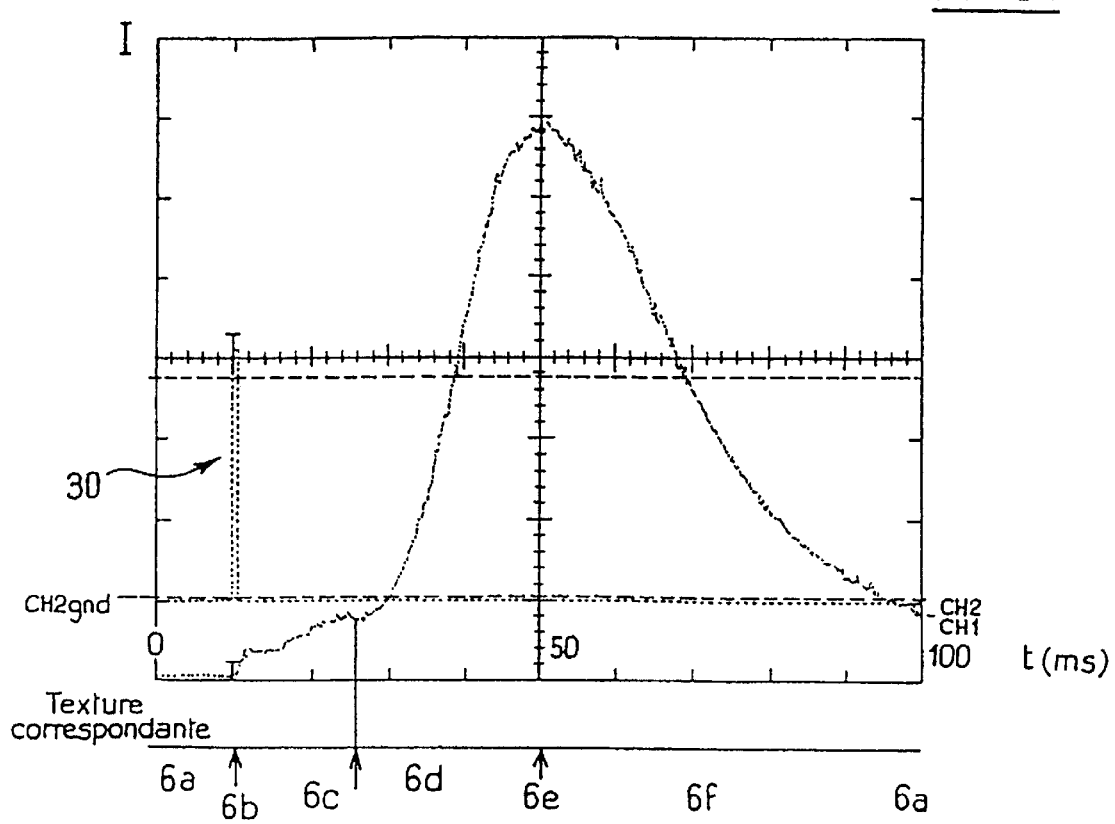
FIG_9
SiO oblique / GLYMO non frotté
d = 2,1 µm
durée impulsion 1ms, V = 31 V.

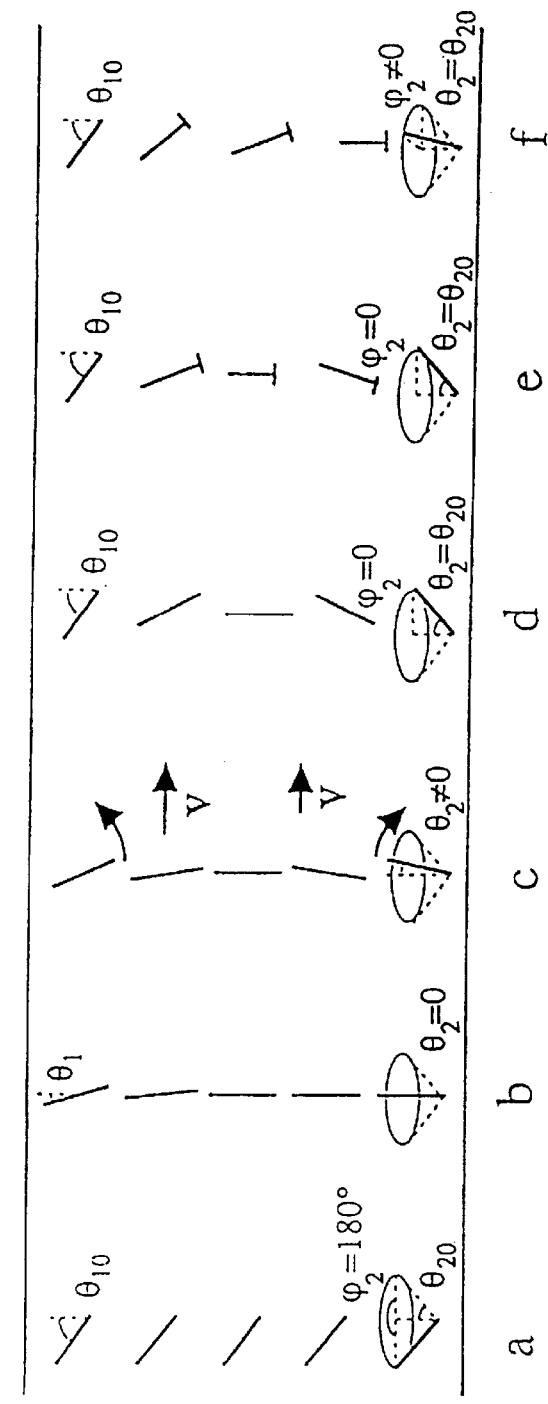
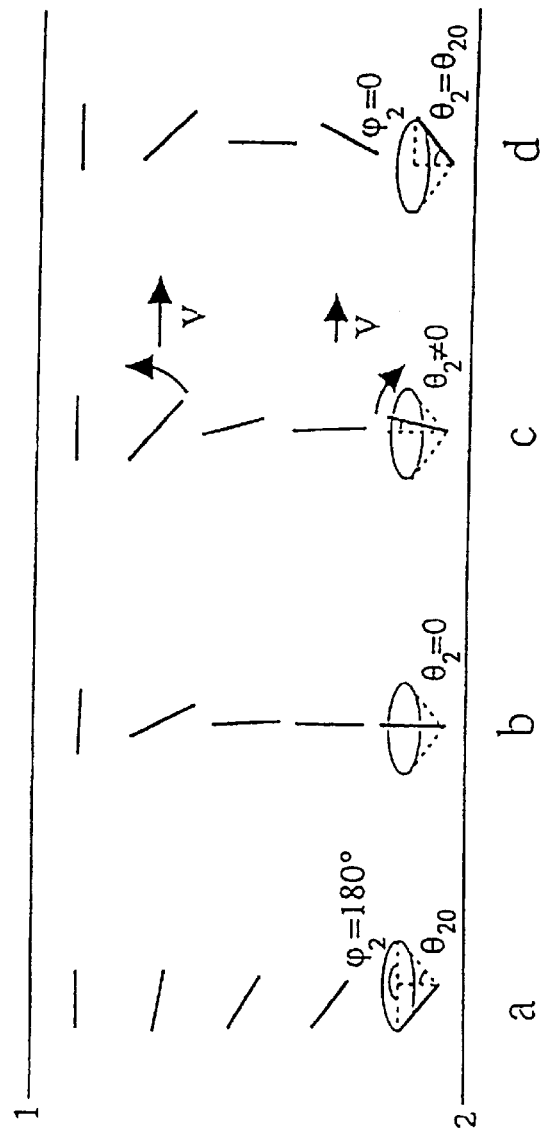
FIG._6
FIG._7

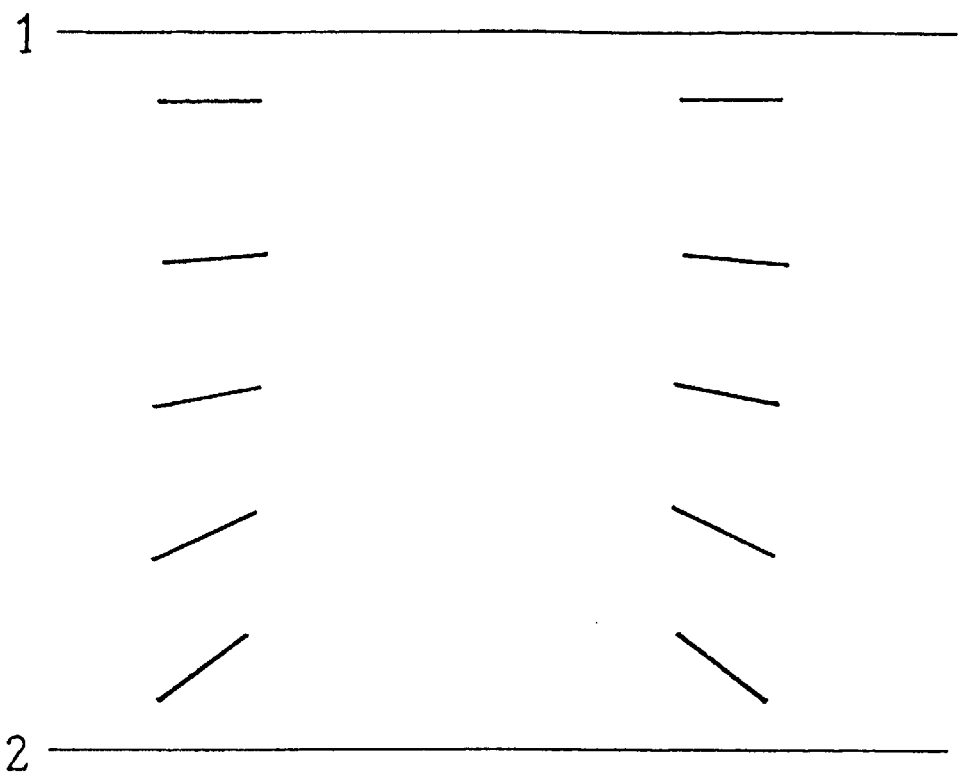
FIG_10
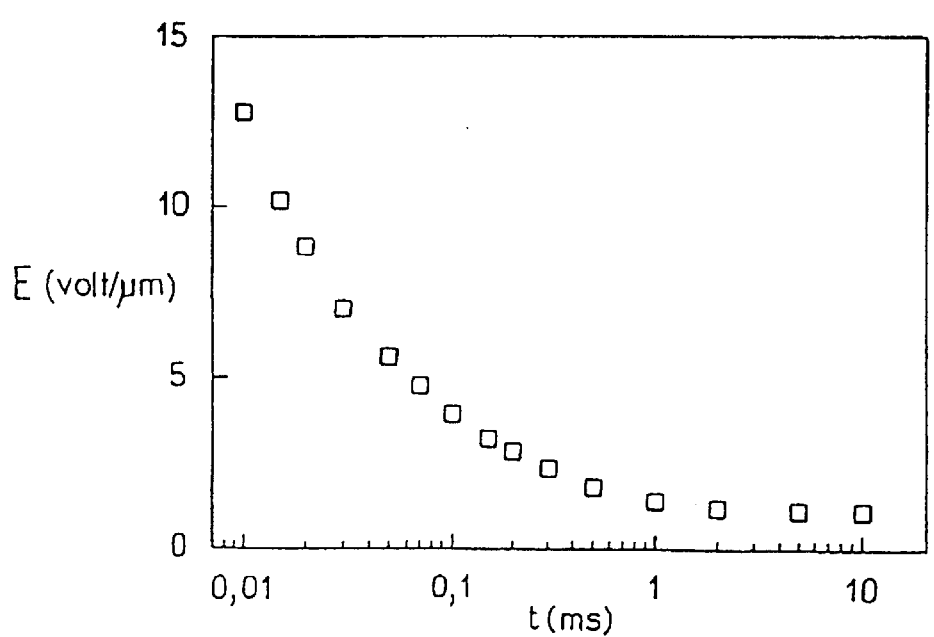
FIG_11

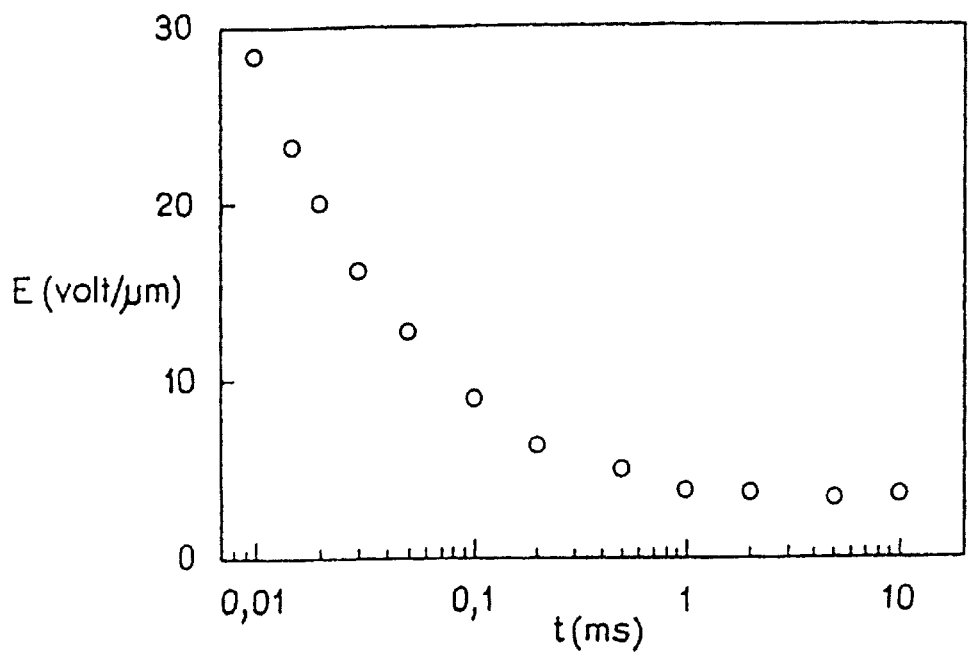
FIG_12
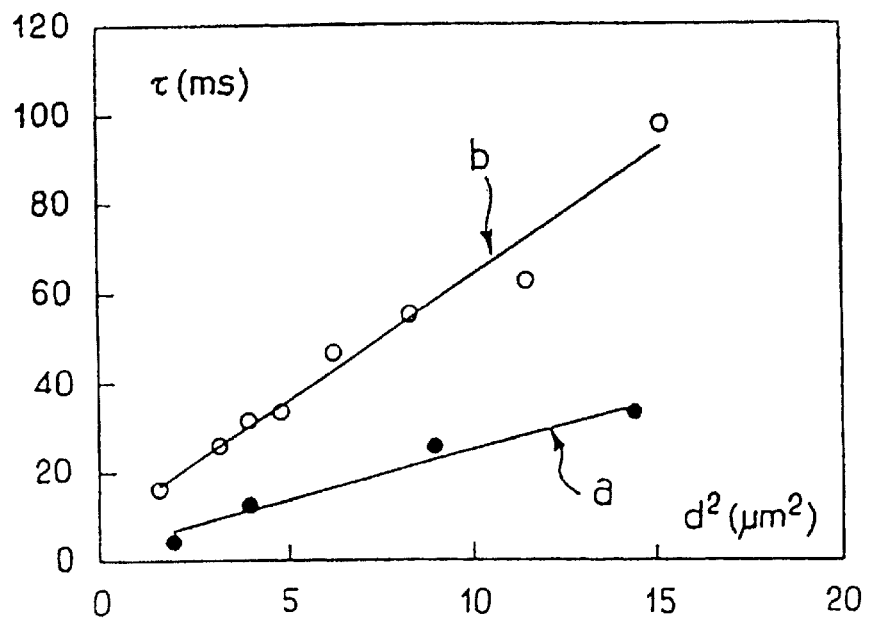
FIG_13

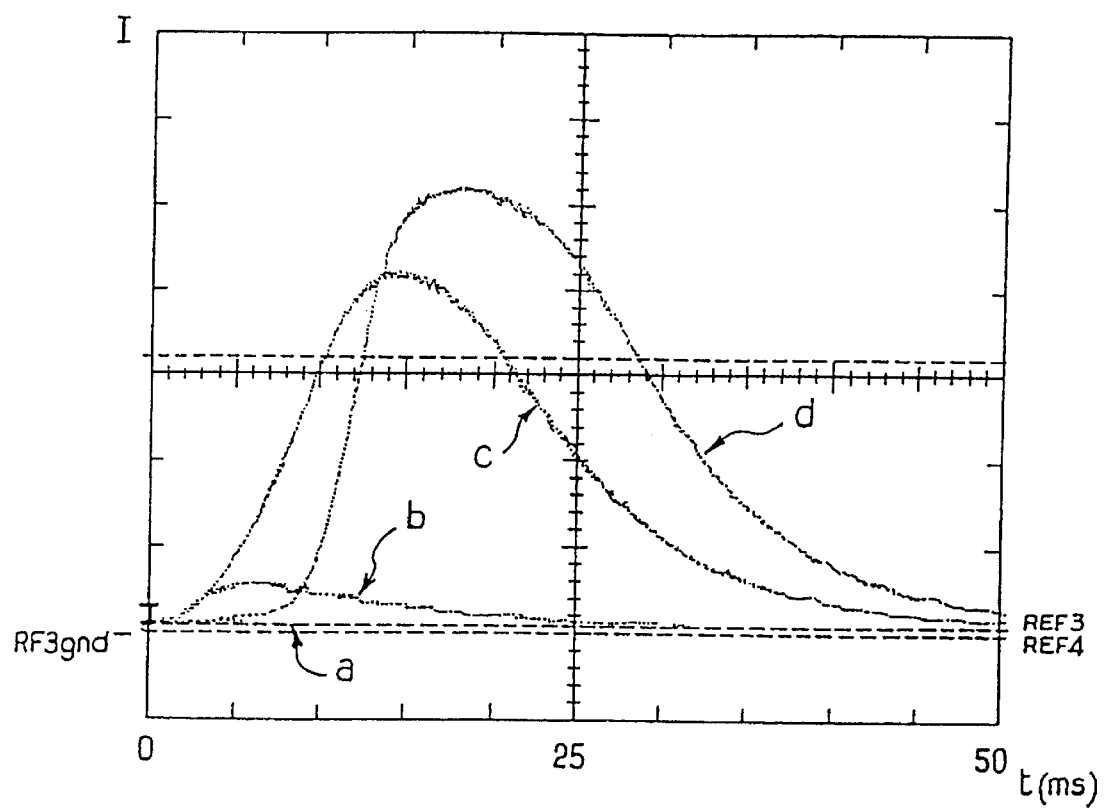
FIG_14

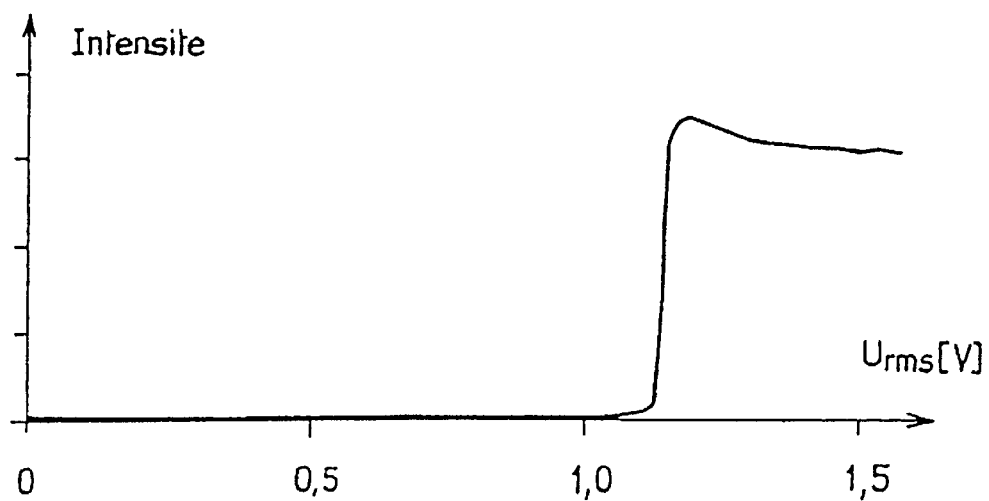
FIG_16
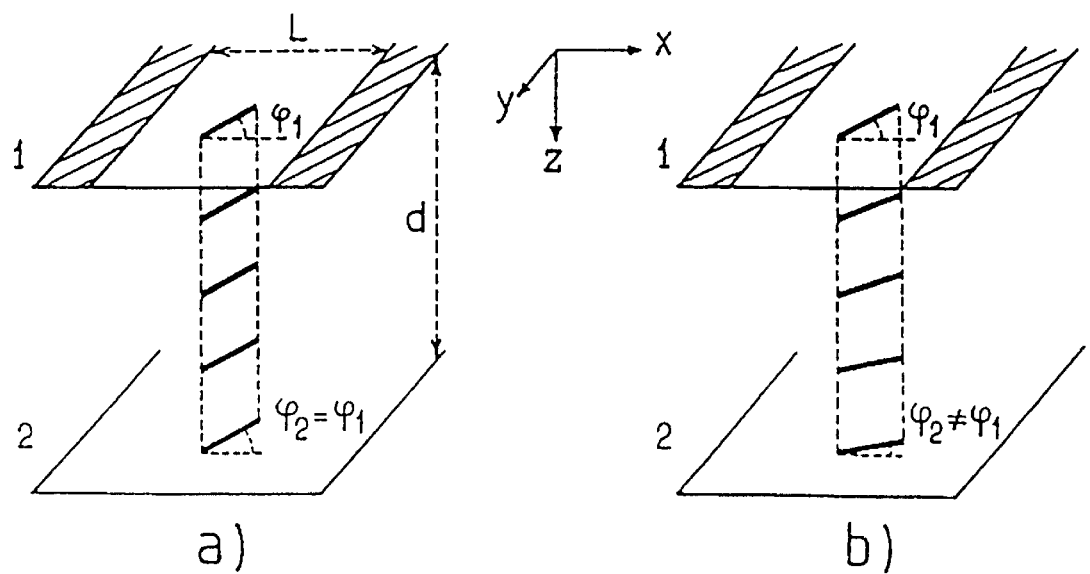
FIG_17

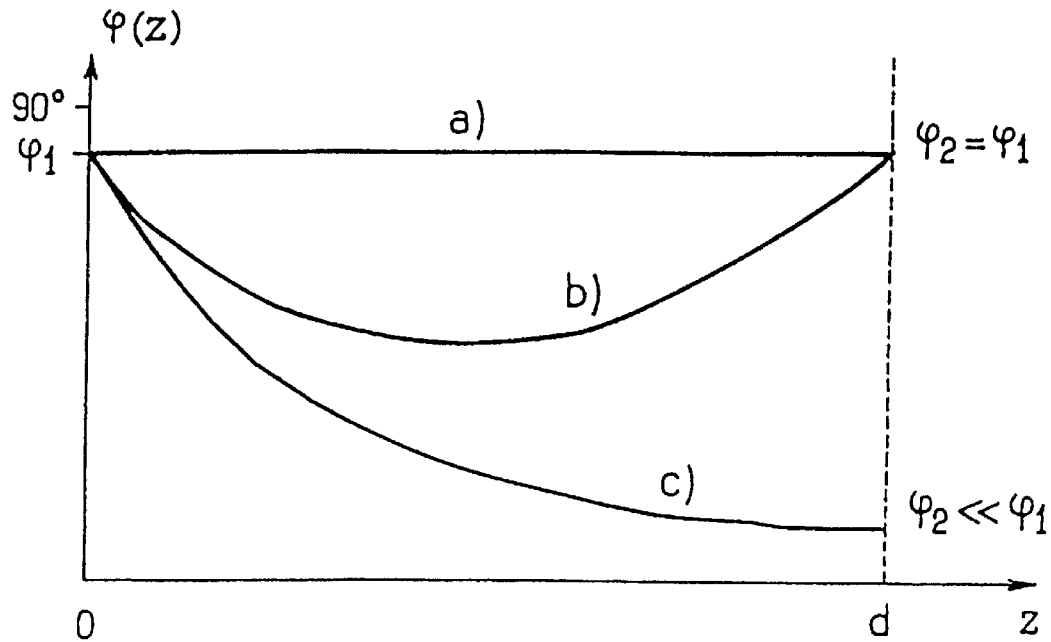
FIG_18
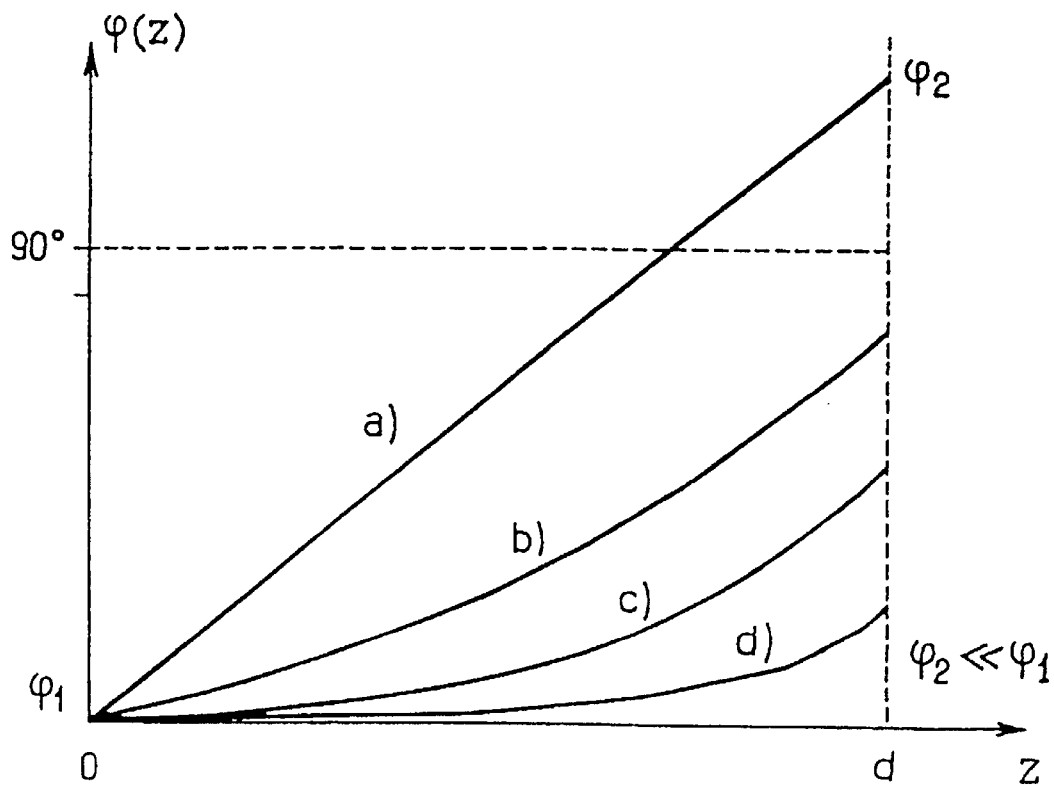
FIG_19

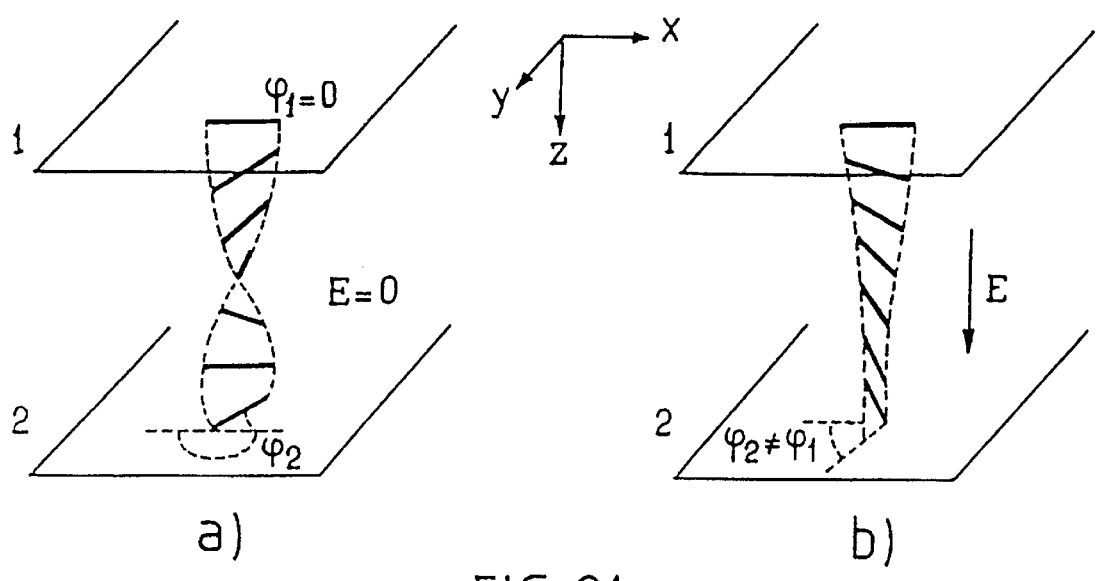
FIG_21
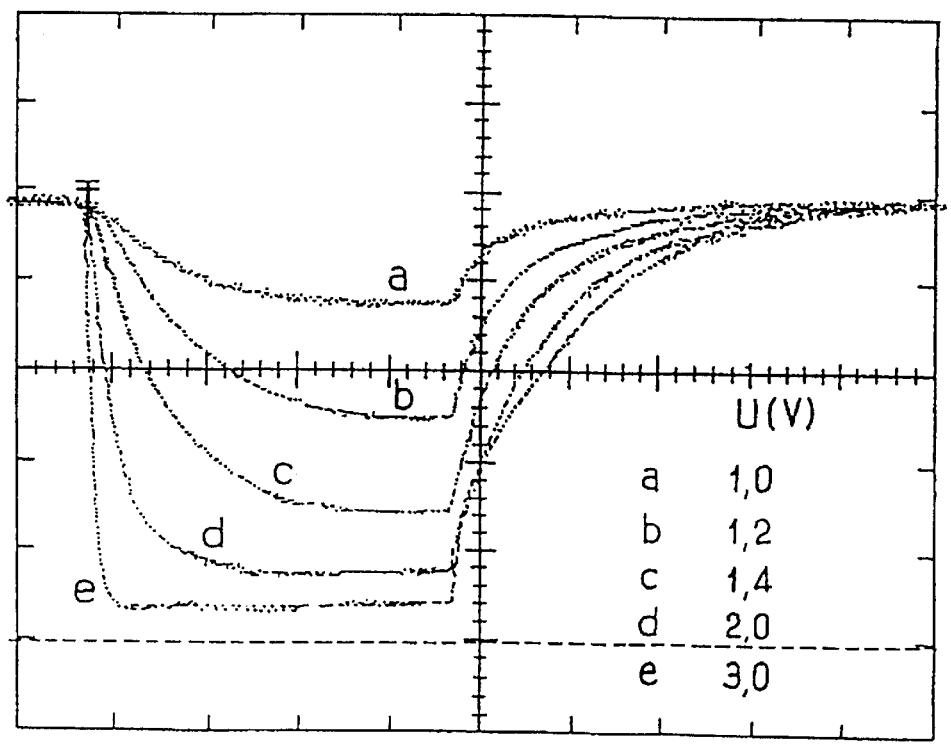
FIG_22

LIQUID CRYSTAL DEVICE COMPRISING ANCHORING MEANS ON AT LEAST ONE CONFINEMENT PLATE PROVIDING A DEGENERATED ORIENTATION

STATE OF THE ART

It is well known to the person skilled in the art that molecules of nematic phases ("nematics") and liquid crystals in general, on coming into contact with a boundary surface, orient themselves in one or more directions because of their interaction with the substrate.

For example, on a solid surface that has been rubbed in one direction, the mesogenic molecules generally orient themselves in a direction close to the rubbing direction. This orientation is said to be "monostable" and is characterized by a single "easy" direction for the nematic, usually defined by the angles $\theta_0$ and $\phi_0$ (see FIG. 1): the zenith angle $\theta_0$ between the easy axis f and the normal z to the substrate; and the azimuth angle $\phi_0$ between the easy axis f and a selected fixed direction in the plane of the substrate.

The easy axis f corresponds to a minimum of the interaction energy between the nematic and the boundary phase.

By applying an external field, it is possible to reorient the nematic on the surface. The surface energy increases, and this additional energy, due to the deflection of the surface director $n_s$ relative to the easy axis f is called the anchoring energy W and it is a function of the angles $\theta$ and $\phi$ that define $n_s$:

$$W=W(\theta, \phi)$$

In the case of monostable anchoring, the anchoring energy W has a single minimum which corresponds to a single easy axis (generally no distinction is made between the direction $n_s$ and the opposite direction $-n_s$, because the nematic phase is non-polar). A large number of treatments (see [1]) give this simple anchoring, which is in very widespread use in liquid crystal display devices.

Nevertheless, there exist anchorings having a plurality of energy minima W and thus having a plurality of easy directions. For example, on layers of SiO evaporated in a vacuum under certain conditions, the orientation of the nematics is bistable, with two easy directions f1 and f2 (see FIG. 2) defined by $\theta_{02}=\theta_{01}$ and $\phi_{02}=-\phi_{01}$. Several devices have been proposed and made using bistable anchoring of nematics. See documents [2–5].

Another well known class of anchorings comprises degenerate anchorings. Under such circumstances, there exists an entire continuum of easy directions, corresponding to the same zenith angle $\theta_0$ and an arbitrary azimuth angle. The anchoring energy in this case is a function of $\theta$ and does not depend on $\phi$:

$$W=W(\theta)$$

In this case it can be said that azimuth anchoring does not exist or that it is infinitely soft.

Depending on the value of $\theta_0$, it is possible to distinguish planar degenerate anchoring ($\theta_0=90°$) with $n_s$ parallel to the surface, or conical degenerate anchoring ($0<\theta_0<90°$) with $n_s$ free to rotate on a cone of aperture angle $2\theta_0$ (see FIG. 3). Another special case corresponds to $\theta_0=0$ (homeotropic anchoring) which gives a monostable anchoring effect with the molecules perpendicular to the surface ($\phi$ is not defined when $\theta=0$)

Degenerate anchorings are typical on a plane surface between the nematic and an isotropic phase. Under such circumstances, there is nothing to impose an azimuth direction, and by symmetry the anchoring energy minimum is achieved for all possible angles $\phi$ ($0 \leq \phi < 360°$).

Experimentally, degenerate anchoring has often been observed on the free surfaces of nematic drops or on nematic-liquid interfaces. This type of anchoring has been studied from an academic point of view, but has not at present found any application because of its unstable nature: the liquid-liquid or liquid-gas interface is very easy to deform, it creates faults easily and it is difficult to apply an electric field through the interface.

Descriptions of the prior art relating to degenerate anchorings are to be found in document [6].

BASIS OF THE INVENTION

From studies performed by the inventors, it results in principle that degenerate anchoring can be obtained on any isotropic solid surface, e.g. inorganic or organic glasses, but that in reality such anchoring is rarely observed because two main phenomena intervene.

The first of these phenomena identified by the inventors corresponds to adsorption of mesogenic molecules on the surface.

On first contact between the nematic and the substrate, e.g. while the cell is being filled, no azimuth direction is imposed and the orientation of the molecules is defined by chance or by the flow. Initial orientation is thus usually very inhomogeneous, with $\theta=\theta_0$ and arbitary $\phi$, but with $\phi$ depending on position on the substrate. Very quickly, the nematic molecules in direct contact with the surface are adsorbed onto the substrate. As a result their order and their orientations are memorized on the surface and they are imposed on the nematic molecules that remain in the volume close to the substrate. Although adsorption is theoretically a reversible process, in practice, the characteristic times for desorption at ambient temperature are very long (days or even years). The orientation of the sample thus remains poorly defined, non-uniform, and strongly anchored to the substrate.

The second of these phenomena identified by the inventors corresponds to the nematic orienting the substrate.

With relatively soft substrates, e.g. polymer layers, a second phenomenon can occur. Even though adsorption is low, the interaction of the substrate with the nematic can make it anisotropic, e.g. by locally orienting the polymer chains. In this case also, the ill-defined and non-uniform initial state is memorized on the substrate, and this is accompanied by azimuth anchoring energy that destroys the degenerate anchoring.

Due to these two orientation memory phenomena, it would appear to be difficult to produce and use degenerate anchoring on solid surfaces. That is why, so far, degenerate anchoring has not found any application.

An object of the present invention is to improve liquid crystal devices to enable degenerate or nearly degenerate anchoring to be used.

More precisely, an object of the present invention is to propose novel means enabling degenerate or nearly degenerate anchoring to be obtained on solid substrates, without liquid crystal memory, thus enabling such anchoring to be used in display devices.

In the context of the present invention, these objects are achieved by a liquid crystal display device comprising a liquid crystal material sandwiched between two confinement plates, the device being characterized by the fact that at least one of the plates is provided with treatment which defines degenerate azimuth anchoring without azimuth orientation memory.

According to another characteristic of the present invention, the treatment is treatment for passivating the surface of at least one of the plates by inhibiting adsorption sites on said surface.

The treatment may be treatment that operates by saturating adsorption sites.

According to another advantageous characteristic of the present invention, the treatment includes a coating comprising a polymer which includes chains that are fluid or very mobile, or indeed are self-lubricating, i.e. lacking any sites capable of adsorbing the liquid crystal.

DESCRIPTION OF THE FIGURES

Other characteristics, objects, and advantages of the invention appear on reading the following detailed description made with reference to the accompanying drawings, given by way of non-limiting example, and in which:

FIG. 1 shows the azimuth orientation of the "easy" direction of the nematic director relative to a confinement plate, and the zenith orientation of the easy direction relative to the normal to said plate;

FIG. 2 shows the orientation of two easy directions for the bistable anchoring case;

FIG. 5 shows the zenith anchoring energy for symmetrical bistable anchoring or for degenerate conical anchoring;

FIG. 6 shows the texture of the liquid crystal during six successive steps of a switching process;

FIG. 7 shows the texture of the liquid crystal during the four successive steps of a switching process in compliance with another variant of the present invention;

FIG. 9 shows the optical response between cross-polarizers of a cell in accordance with the present invention;

FIG. 10 shows two flat textures that can be obtained with planar anchoring on a backplate;

FIG. 11 shows write thresholds as a function of control pulse duration, measured on a cell that has been subjected to polyisoprene treatment;

FIG. 12 shows write thresholds as a function of control pulse duration, measured on a cell that has had polystyrene treatment;

FIG. 13 shows the spontaneous erase time of a cell as a function of the square of the thickness of the cell concerned;

FIG. 14 shows various curves illustrating the optical response of a cell of the present invention for electric control pulses of fixed duration and of different amplitudes;

FIG. 16 shows mean light intensity as a function of rms voltage;

FIG. 17 shows a variant in which both electrodes are disposed on the same plate;

FIG. 18 shows the angle φ(z) for two displays, one in accordance with the invention, and the other conventional;

FIG. 19 shows the twist in a cell that has been chiralized;

FIG. 21 shows a chiralized or cholesteric nematic device;

FIG. 22 shows the optical response of the device;

DETAILED DESCRIPTION OF THE INVENTION

Figure 3:
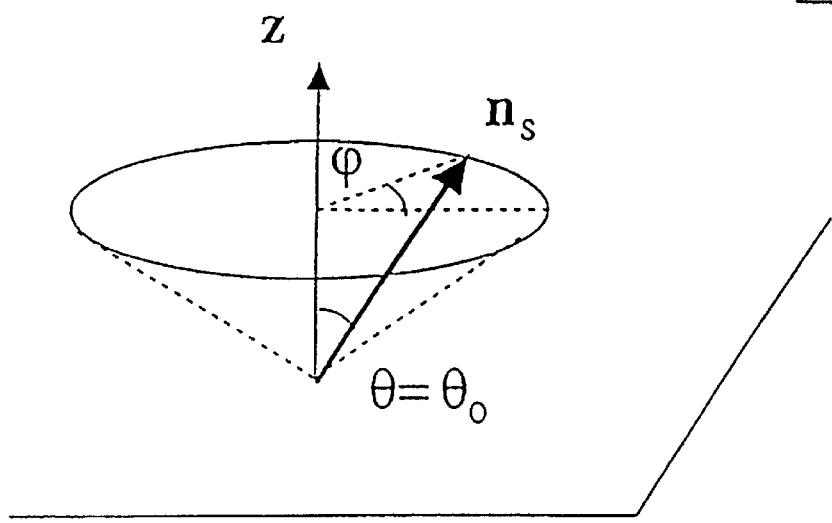
FIG. 3 shows the conical anchoring case.

I—Characteristics of the Invention Relating to Substrate Passivation by Saturating Adsorption Sites with Surface-active Agents As mentioned above, in a first approach of the present invention, the unwanted memory of the surface of a confinement plate is eliminated by a thin layer of an appropriate surface-active agent on the substrate. The function of this surfactant is to occupy the adsorption sites available on the surface, thereby "passivating" the substrate, preventing it from adsorbing the liquid crystal itself.

The passivation material may be constituted by any surfactant that reacts strongly with the surface of the confinement plate and that is easily adsorbed thereon, preferably in definite manner. The surfactant is preferably also selected to avoid strong interaction with the liquid crystal, e.g. to be unsuitable for being easily oriented by anisotropic interactions with mesogenic molecules.

Once the surface of the confinement plate has been covered in surfactant molecules, it becomes inert: it no longer adsorbs liquid crystal molecules, and furthermore it does not become anisotropic when exposed thereto.

For a substrate that is rigid and flat, e.g. an inorganic glass, a monomolecular layer of surfactant suffices to saturate all of the available adsorption sites and to passivate the surface. For a substrate that is rough and porous, e.g. a layer of evaporated SiO, the surfactant film is preferably thicker to ensure passivation. For soft substrates, e.g. polymers, the passivation material is advantageously constituted by a thicker layer to provide strong screening of the interaction between the substrate and the liquid crystal, thereby preventing the polymer from being oriented and the hysteresis that results therefrom.

To passivate different substrates by saturating adsorption sites the inventors have tested, in particular, various surfactants belonging to the organofunctional silane family, including chlorosilane groups (Si—Cl), silanol (Si—OH), or alkoxysilane (Si—$C_nH_{2n}$OH). To adhere to the surface, these substances present the property of being adsorbed easily on glass or other substrates, and after heat treatment they present the property of reacting chemically with the surface. The surfactant layer obtained in this manner is very strong and impenetratable for mesogenic molecules.

The organofunctional group is selected to minimize interaction between the surfactant and a mesogenic molecule, so as to avoid the phenomena of memory and of hysteresis.

Nevertheless, the invention is not limited to the organofunctional silane family.

It extends to any equivalent compound, i.e. to any compound capable of performing the two above-specified functions: a) adhering to the substrate, b) not interacting with the liquid crystal material, e.g. based on chromium complexes. Document [7] gives the examples of chromium complexes suitable for defining homeotropic anchoring.

Experimental results have shown that most of the silanes tested reduce the memory of the substrates on which they were deposited.

Particularly advantageous and reproducible results were obtained using 3-glyceryloxpropyl trimethoxysilane (GLYMO). This substance has been deposited in thin layers (20 Å to 1000 Å thick) on substrates from a solution in isopropanol (0.01% to 0.5%). The layers were baked for 1 hour at 120° C. or 200° C. to make them insoluble in the liquid crystal. To test anchoring, the inventors use the pentylcyanobiphenyl (5CB) nematic at ambient temperature. The test cells were made using two different plates: the tested plate with surfactant treatment, and a "standard" plate having strong and monostable anchoring (evaporated SiO).

On all of the isotropic substrates used (glass, float glass, indium and tin double oxide), the inventors have observed that depositing a GLYMO layer of thickness greater than about 100 Å gives rise to degenerate planar anchoring ($\theta_0 \approx 90°$) without any orientation memory: the orientation of the nematic in the test cell is uniform, defined by the standard plate, and under the action of an external electric or magnetic field said orientation changes in uniform manner and without memory. The azimuth anchoring energy on substrates provided with a passivation layer thicker than 100 Å was strictly equal to zero. Layers finer than 100 Å gave very low azimuth anchoring energy, less uniform anchoring, and less reproducible results.

The inventors also tested the action of passivation layers of GLYMO on anistropic substrates. The substrates tested were glass plates having transparent ITO electrodes and a fine layer (5 Å to 1000 Å) of SiO, vacuum evaporated at a glancing angle (75°). Without a passivation layer, the orientation of the 5CB nematic on such substrates was monostable planar, inclined bistable, or inclined monostable, depending on evaporation conditions. In all cases, the substrates demonstrated very strong memory of the initial orientation of the nematic due to the strong adsorption of mesogenic molecules on the porous and polar layer of SiO.

After a fine passivation layer ($\geq 20$ Å) had been applied, the orientation memory disappeared almost completely. On all substrates, the alignment of 5CB on the passivation layers was monostableplanar (without pretilt) in a direction perpendicular to the evaporation plane. The azimuth anchoring energy was very strong for the finest layers, with an extrapolation length $L \leq 40$ Å. This anchoring energy decreased progressively with increasing thickness d of the GLYMO film, and for d>200 Å, L diverged and the anchoring became degenerate and planar.

According to an advantageous characteristic of the present invention, the thickness of the passivation layer preferably lies in the range 20 Å to 500 Å.

Similar results have been obtained by using a GLYMO layer to passivate glass or ITO substrates that had been made aniostropic by rubbing. Without passivation, those substrates aligned 5CB in monostable planar manner, with strong azimuth anchoring and with a very great degree of surface memory. By depositing a GLYMO layer on the substrates, the inventors observed complete disappearance of the memory and a reduction in the anchoring force. Again, anchoring energy decreased progressively with increasing d, and at d>200 Å, it had become zero: anchoring had become degenerate and planar, with negligible memory.

Similar results were also obtained with one-way rubbing of the GLYMO layer previously deposited on an isotropic substrate.

These results confirm that the orientation memory of a confinement plate can be eliminated by appropriate surfactant treatment which saturates the adsorption sites available on the substrate. Two different objectives are achieved by the treatment:

a) surface memory on isotropic substrates is greatly reduced or completely eliminated. The resulting degenerate conical or planar anchoring is very homogeneous, easy to use, and without orientation hysteresis; and b) on anisotropic substrates, the treatment also makes it possible to change the strength of the azimuth anchoring. This makes it possible to reduce the strength of monostable or bistable anchoring, making them almost degenerate, with a very low breaking threshold for azimuth anchoring.

In another variant of the present invention, the passivation treatment can be formed by depositing a coating that is sufficiently thick to prevent access by the liquid crystal molecules to adsorption sites formed on the substrate, without it being necessary for the coating to saturate each of said sites.

II—Characteristics of the Invention Relating to "Lubricating" Azimuth Anchoring on Surfaces by Layers of Polymers Having Chains that are Fluid Or Very Mobile The present invention also proposes avoiding surface hysteresis by applying an isotropic vitreous or liquid layer on the substrate using molecules that serve not only to inhibit adsorption sites on the substrate as mentioned above, but that can also easily be reoriented or deformed so that the confinement plate treated in this way loses all prior orientation memory. This layer acts as an orientation lubricant: it makes it possible for the orientation of the nematic director $n_s$ on the surface to slide over the substrate without friction or hysteresis. It should be observed that under such circumstances, it does not matter if mesogenic molecules are adsorbed on the layer of lubricant: when a torque is applied to $n_s$, the adsorbed molecules can easily take up a new orientation without being desorbed, because the "soft" molecules of the lubricant layer deform and take up new orientations.

Such an "anchoring lubricant" can be constituted by polymers which are in the liquid phase at ambient temperature (or more precisely, throughout the thermal stability range of the mesogenic phase used). Under such circumstances, it is necessary to graft the lubricant layer on the substrate so that its molecules adhere strongly, and so as to prevent them dissolving or being diffused in the liquid crystal. Layers prepared in this way are both very stable from the macroscopic point of view and very mobile at molecular level. Alternatively, it is possible to use solid polymers in the vitreous state as the anchoring lubricants, providing their chains are sufficiently mobile and their viscosity is moderate. This condition is easily satisfied if the polymer is close to its melting point at ambient temperature.

In particular, the inventors have tested a plurality of liquid polymers in the siloxane and vitreous polymer family, having a melting temperature close to ambient (e.g. polyisoprene and polybutadiene). These substances have highly mobile chains. Two nematics at ambient temperature were used in this study: 5CB and the nematic mixture MLC 6012 (Merck). When deposited in fine layers on the substrates, all of the substances gave degenerate anchoring to both nematics in the study without any orientation memory.

A typical result is described below, which result was obtained with polyisoprene polymer that is vitreous at ambient temperature. A uniform fine layer (<300 Å) was deposited using a spinner, and starting from a solution in cyclohexane (0.3% to 3%). The layer was used without any heat treatment to avoid transforming the polymer into its liquid phase since that would have destroyed the uniformity of the film. In the long term (days) the inventors observed phenomena of polyisoprene being transported from the plate under study to the standard plate as used in the test cells. That is why the inventors used standard plates having anchoring that was not sensitive to the slow migration of polyisoprene molecules: rubbed polyimide layers, giving strong, planar or inclined monostable anchoring.

The polyisoprene layers deposited on isotropic substrates (ordinary glass, float glass, transparent ITO electrodes on glass) gave excellent degenerate orientation with the nematics investigated. No anchoring memory was detected in the test cells: the orientation of the easy axis on the polyisoprene was always in the same plane as on the standard plate. Under the action of external fields, the easy axis on the plate under investigation took up a new orientation in uniform manner without hysteresis and without any azimuth anchoring energy.

When the layers of polyisoprene were deposited on anisotropic substrates (rubbed glass or ITO, evaporated SiO) which normally give strong monostable anchoring, the azimuth anchoring energy was decreased. By changing the thickness of the deposited layer, the inventors observed a progressive transition between strong monostable anchoring of the substrate and degenerate anchoring, typical for the polyisoprene layer. This was also accompanied by complete disappearance of orientation memory.

Finally, the zenith angle $\theta_0$ of the degenerate anchoring on polyisoprene depends on the nature of the substrate and on the nature of the nematic. For the nematic mixture MLC 6012 (Merck), anchoring was always degenerate and planar ($\theta_0=90°$). For 5CB, anchoring was degenerate and planar for polyisoprene deposited on evaporated SiO, whereas it was degenerate and conical ($\theta_0$ close to 55° the "magic" angle) if the polyisoprene film was deposited directly on glass.

Very similar results were obtained by grafting onto the substrates, polystyrene terminated by a chlorosilane group, which was specifically synthesized for the study. The polystyrene used to modify the surfaces (referred to below as functional PS) was synthesized anionically using a conventional method to obtain polymer chains terminated at one end only by $SiCl_3$. The molecular mass of the functional PS was typically 40,000 g/mol, but it could be varied in the range 1000 g/mol to $10^6$ g/mol.

To graft the polymer, a solution of functional PS was initially prepared in anhydrous toluene, at a volume fraction of about 5%. The surfaces to be grafted were cleaned in a flow of oxygen under UV. The functional PS solution was deposited on said clean surfaces by using a spinner. After the toluene has evaporated off, the surfaces covered in functional PS were baked in a vacuum, typically for 24 hours at a temperature of 160° C. Excess functional polymer was then removed by cold dissolution in toluene, possibly with the help of ultrasound. The quantity of grafted PS was measured by ellipsometry.

The grafting of polystyrene on isotropic substrates (glass or ITO) results in memory-free degenerate conical anchoring of the 5CB nematic that is very uniform and reproducible. In addition, the treatment by grafted polystyrene is very stable over time: the grafted molecules do not dissolve into the liquid crystal and they continue to adhere to the surface, even after mechanical treatment has been applied thereto, e.g. one-way rubbing on cloth.

Grafting polystyrene on anisotropic substrates (rubbed glass or ITO, evaporated SiO) reduces azimuth anchoring energy and eliminates anchoring memory. By varying the initial aniostropy of the substrate or the density of the grafting, the inventors observed continuous variation in azimuth anchoring energy between the usual strong value for non-treated substrates and the typical degenerate anchoring of the grafted layer. In this way, the inventors were able to obtain nearly degenerate anchoring in highly reproducible manner. Similar results were also obtained by mechanically rubbing an already-grafted polystyrene layer.

In a variant embodiment, it is possible to use a self-lubricating material, i.e. a material having no sites capable of adsorbing the liquid crystal, without necessarily including fluid or mobile chains for coating the confinement plate or for making said plate directly without any coating. This disposition is particularly suitable when one of the plates does not have an electrode. An example of this disposition is described below.

IMPLEMENTATION OF THE INVENTION

Most nematic display devices make use only of volume effects. In such displays, changes in texture occur as continuous deformation through the volume without any reorientation on the surfaces. By their very nature, such devices need strong monostable anchoring in order to operate.

Recently, nematic displays using a break in anchoring on the surfaces have been proposed and made. See documents [2–5], [8], [9]. In those devices, the orientation of the liquid crystal on the surface changes suddenly in operation of the display, thus making it possible to transform the volume texture and to switch between two bistable textures (i.e. textures which remain stable for long periods without external fields being applied). The main advantages of such devices lies in their bistable nature and in their switching speed. Nevertheless, nematic displays with a bistable surface also present certain drawbacks: anchoring is more difficult to achieve and control therein.

The display proposed in documents [2–5] requires rather complex anchoring: the two states used differ both in azimuth angle and in zenith angle (pretilt angle). At present such anchoring remains difficult to achieve.

The device proposed in documents [8] and [9] uses simpler anchoring (monostable). However, to shorten the duration and to decrease the voltage of control pulses, it requires zenith anchoring energy levels that are moderate or small, and manufacturing techniques for that purpose are not yet completely mastered.

The inventors now propose novel means enabling degenerate anchoring to be produced (i.e. without any azimuth anchoring energy, and without any surface memory) or anchoring that is nearly degenerate (i.e. without small azimuth anchoring energy and without any surface memory). Such anchoring is easy to produce and to control using external electric fields. The zenith anchoring force is moderate or even small, and that is why it is suitable for use in display devices.

The switching of degenerate anchoring displays can be controlled by breaking the degenerate anchoring and then controlling the broken anchoring. Another solution is to apply azimuth torque that turns the degenerate anchoring.

Figure 4:
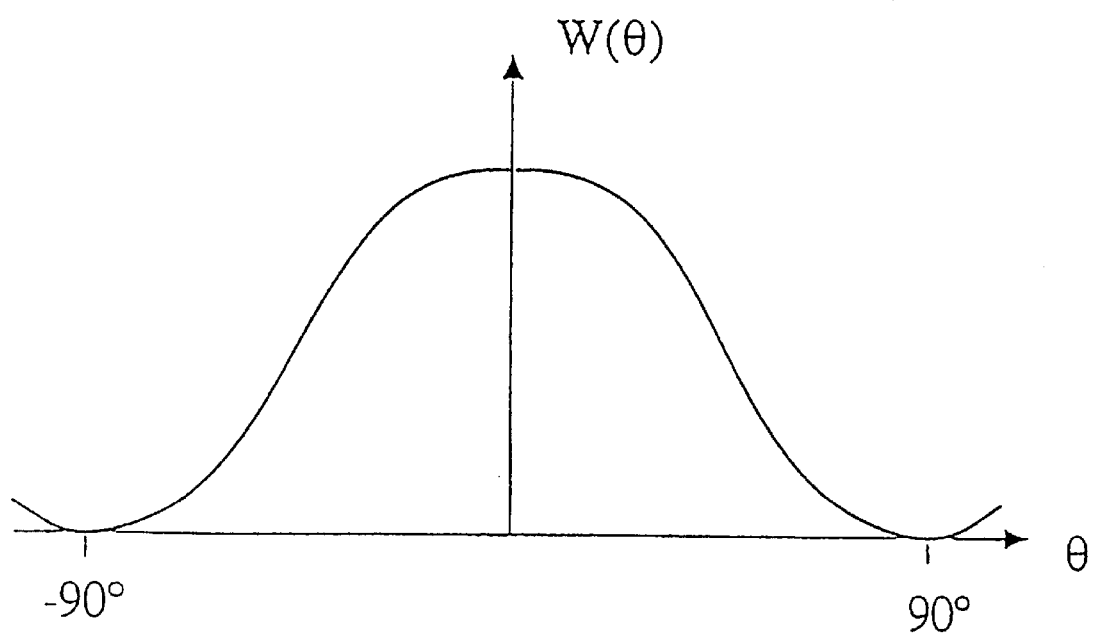
FIG. 4 shows the zenith anchoring energy for a monostable planar alignment.

I—Devices with Switching by Breaking Anchoring that is Degenerate or Nearly Degenerate I-1) Breaking Degenerate Anchoring To understand surface breaking in the case of degenerate anchoring, we begin by recalling the simplest case of breaking monostable anchoring. FIG. 4 shows the zenith anchoring energy which corresponds to monostable planar alignment. In the absence of an external field, the director $n_s$ on the surface takes up an orientation along the minimum of $W(\theta)$ which corresponds to $\theta=\pm 90°$ (these two directions are physically equivalent, and this is the reason why the anchoring is considered to be monostable).

Under an electric field E, the molecules in the volume orient themselves along the field (assuming that the dielectric anisotropy of the liquid crystal $\Delta\epsilon$ is positive). A torque is exerted on $n_s$: the nematic reorients itself on the surface under the action of the field. In general, the stronger the external torque, the closer the new orientation $n_s$ comes to the direction of the field, but without ever reaching it (because the return torque due to the surface anchoring opposes it). An important exception to this rule is the case where the field E is oriented in the direction which corresponds to a surface energy maximum (the direction $\theta=0$ in FIG. 4). In this direction, the return torque due to the anchoring becomes zero and can no longer oppose the field E: $n_s$ thus becomes parallel to E when the field is strong enough, greater than a threshold value $E_c$.

If the field is now switched off, the surface is at $\theta=0$ in unstable equilibrium and can return to one or other of the stable equilibrium positions ($\theta=\pm 90°$). Which particular position depends on chance, due to fluctuations, or else it can be induced by applying a small control effect to the cell.

In practice, the only direction in which it is easy to apply a strong field E is normal to the plates. The above-described break in anchoring is thus possible, by symmetry, only for planar anchoring, or for other anchoring that is symmetrical about $\theta=0$.

The zenith energy of such anchoring, symmetrical bistable anchoring, is shown in FIG. 5. This anchoring can be broken by a field normal to the cell in two different directions: $\theta=0$ if $\Delta\epsilon>0$; $\theta=\pm 90°$, if $\Delta\epsilon<0$. FIG. 5 can also be interpreted as the zenith portion of degenerate anchoring, which by definition has zero azimuth energy (the two branches $\theta>0$ and $\theta<0$ then correspond to the same zenith angle $\theta$, and to two azimuth angles that are 180° apart). The same conclusions as those obtained for bistable conical anchoring remain valid for this degenerate conical anchoring: it breaks at $\theta=0$ or at $\theta=90°$ (with arbitrary $\phi$).

In the context of the invention, bistable symmetrical anchoring can be considered as anchoring that is very close to degenerate anchoring: the degenerate anchoring energy $W(\theta)$ has cylindrical symmetry and it is a function of $\theta$ only; if a small amount of azimuth energy $W\phi(\phi)$ that is symmetrical about $\phi=0$ is superposed on said energy, then bistable symmetrical anchoring is obtained. The anchoring obtained by such superposition is referred to as "nearly degenerate anchoring" in the context of the present patent application.

A special case of nearly degenerate anchoring is obtained when starting from degenerate planar anchoring ($\theta_0=90°$): this is planar anchoring with very small azimuth energy.

With degenerate anchoring (or nearly degenerate anchoring) the azimuth anchoring energy is zero (or very small), but the zenith energy is arbitrary and can be strong. In practice, such anchoring is less aniostropic than monostable anchoring and as a general rule the zenith anchoring is moderate or weak.

I-2) Controlling Broken Anchoring Various Means Can Be Used to Control Broken Anchoring.

In a preferred embodiment of the invention such control is provided by a hydrodynamic surface flow. Such control by the hydrodynamic surface effect can comply with the dispositions described in documents [8] and [9] to which reference may usefully be made for a good understanding of the present invention.

We begin by considering the cell shown in FIG. 6a. The plate 1 has strong monostable anchoring of conventional type, preferably with a pretilt ($\theta_{01}<90°$). The plate 2 has anchoring that is degenerate planar or conical ($\theta_{02}\neq 0$, $\phi_{02}$ arbitrary) in accordance with the present invention. The elastic energy of the volume is minimized for a plane texture with $\phi_2=180°$, as shown in FIG. 6a.

If an electric field $E_{c1}>E>E_{c2}$ is applied perpendicularly to plate 1 and 2, then the anchoring on the degenerate anchoring plate 2 breaks, and a practically homeotropic texture is obtained as shown in FIG. 6b. $E_{c1}$ and $E_{c2}$ correspond to respective breaking thresholds on the two plates.

If the field E is turned off suddenly, then the plate 2 finds itself in unstable equilibrium, with no torque being applied thereto. In contrast, the plate 1 is in disequilibrium and has a strong return torque acting on molecules close thereto due to the anchoring, thus constraining them to return to their initial orientation. This return creates a mass flow which diffuses rapidly through the cell to the plate 2 (FIG. 6c). By interacting with this flow, the molecules on the plate 2 set off in the direction that is opposite to their initial orientation ($\phi_2=0$, FIG. 6c)

Once $\theta\neq 0$, the return torque due to the zenith anchoring of the plate 2 reappears and accelerates relaxation of the plate 2 towards the state $\theta_{02}=\theta_{20}$, $\phi_2=0$ (FIG. 6d). This texture (FIG. 6d) which is made quickly (a few tenths of a microsecond) after the end of the control pulse is different from the initial texture—the display has been written to.

The written texture shown in FIG. 6d is nevertheless not stable when $\theta_1$ and $\theta_2$ are sufficiently large, since it presents a high level of elastic energy in bending. Spontaneously, after a few milliseconds, it relaxes into a bulk conical helical texture without changing the surface anchoring (FIG. 6d). This bulk twisting applies an azimuth torque to the degenerate anchoring of the plate 2, thereby causing the director to turn around the anchoring cone (FIG. 6f), finally bringing it back to the equilibrium position $\phi=180°$ by unwinding the conical helix (FIG. 6a). Movement over the cone is slowed down by the surface viscosity and lasts for several tens of milliseconds.

In contrast, the texture of FIG. 6d can be stable if $\theta_1$ and $\theta_2$ are small. The resulting device thus presents bistable properties.

A monostable display is thus obtained which can be written to using pulses that are very short ($\tau_1 \leq 10 \, \mu s$) and it erases spontaneously over a length of time that is much longer ($\tau_e \geq 10$ ms). In addition, depending on the application, $\tau_e$ can be adjusted over a wide range by modifying the anchoring and the thickness of the cell.

Naturally, other processes can be used to control the breaking of anchoring.

Where necessary, the display of FIG. 6 can be transformed into a bistable display. Firstly, if the molecule mean tilt angle $(\theta_1+\theta_2)/2$ is less than a critical value $\theta_c$, then the bent state (FIG. 6d) is stable. To go from the bent state to the minimum energy tilted uniform state (FIG. 6a), the texture must pass through the 180° twisted state (FIG. 6e). This intermediate state forms a barrier which stabilizes the bent state so long as $(\theta_1+\theta_2)/2<\theta_c$. The critical angle $\theta_c$ lies in the range about 45° for compounds having very low twisting energy, to 90° (bent state always stable) for compounds in which elastic energy in bending and in twisting is equal.

In addition, it suffices to replace anchoring on the plate 2 by almost degenerate anchoring. Under such circumstances, only the positions ($\phi_2=0$ and $\phi_2=180°$ on the cone $\theta_2=\theta_{20}$ are stable, and a small barrier due to the azimuth anchoring $W_\phi$ separates them. The texture 6d is then transformed into a twisted conical texture which remains stable if the anchoring barrier $W_\phi$ is greater than the twisting bulk energy. A bistable display is thus obtained. To erase the twisted texture, it suffices to apply a new pulse, and this time to switch off the field progressively. Hydrodynamic interaction is now absent and a small bulk elastic interaction favors returning to the "uniform" state of FIG. 6a: the display is erased.

Naturally, the present invention is not restricted to the particular embodiment described above, but extends to any variant within the spirit of the invention.

In particular, in the ambit of the present invention, it is possible to envisage:

controlling the breaking of anchoring by a bulk hydrodynamic effect;

controlling the breaking of anchoring by superposing two hydrodynamic effects, a bulk effect and a surface effect; and switching without completely breaking the surface, by rotating the director over the degenerate anchoring cone.

In yet another variant, it is possible to envisage breaking anchoring on both plates (for a liquid crystal with positive dielectric anisotropy, a uniform homeotropic state is then obtained under the field, or else a planar state for negative aniostropy). With any additional control after the field has been switched off, the final state may be random. However, if so desired, the final state of the structure can be controlled with an additional command, such as an electric field or a flow of appropriate orientation, e.g. horizontal.

I-2 a) Controlling the Breaking of Anchoring by a Bulk Hydrodynamic Effect

The above-described hydrodynamic effect (FIG. 6c) is created by the molecules on the plate 1 returning quickly to their initial orientation under the action of the anchoring torque on said surface. If anchoring on the plate 1 is very strong, then during the control pulse the molecules close to the surface do not change their orientation, and as a result the texture shown in FIG. 7b is obtained: homeotropic texture throughout except for a thin bulk layer in the vicinity of the plate 1. After the field has been switched off, the molecules on the surface 1 do not take up a new orientation, and as a result there is no surface hydrodynamic effect. Nevertheless, relaxing the highly deformed bulk layer to a more homogeneous texture creates a bulk hydrodynamic flow (FIG. 7c) known as the "backflow" effect (see document [10]). That flow diffuses towards the plate 2 and controls breaking of anchoring on said plate, in exactly the same manner as in the case of a surface hydrodynamic effect.

A state is thus obtained that is equivalent to that shown in FIGS. 6d and 7d, i.e. either a stable state if $\theta_1$, and $\theta_2$ are small, or a state that moves on to the states shown in FIGS. 7e and 7f.

In FIG. 7, planar anchoring on the plate 1 is shown. However in a variant, said anchoring on the plate 1 could be tilted.

I.2 b) Controlling the Breaking of Anchoring by Superposing Two Hydrodynamic Effects: a Bulk Effect and a Surface Effect Finally, the flows created by the two hydrodynamic effects, the surface effect and the bulk effect, take place in the same direction and are therefore cumulative: in practice, surface breaking is controlled by superposing both effects.

Figure 8:
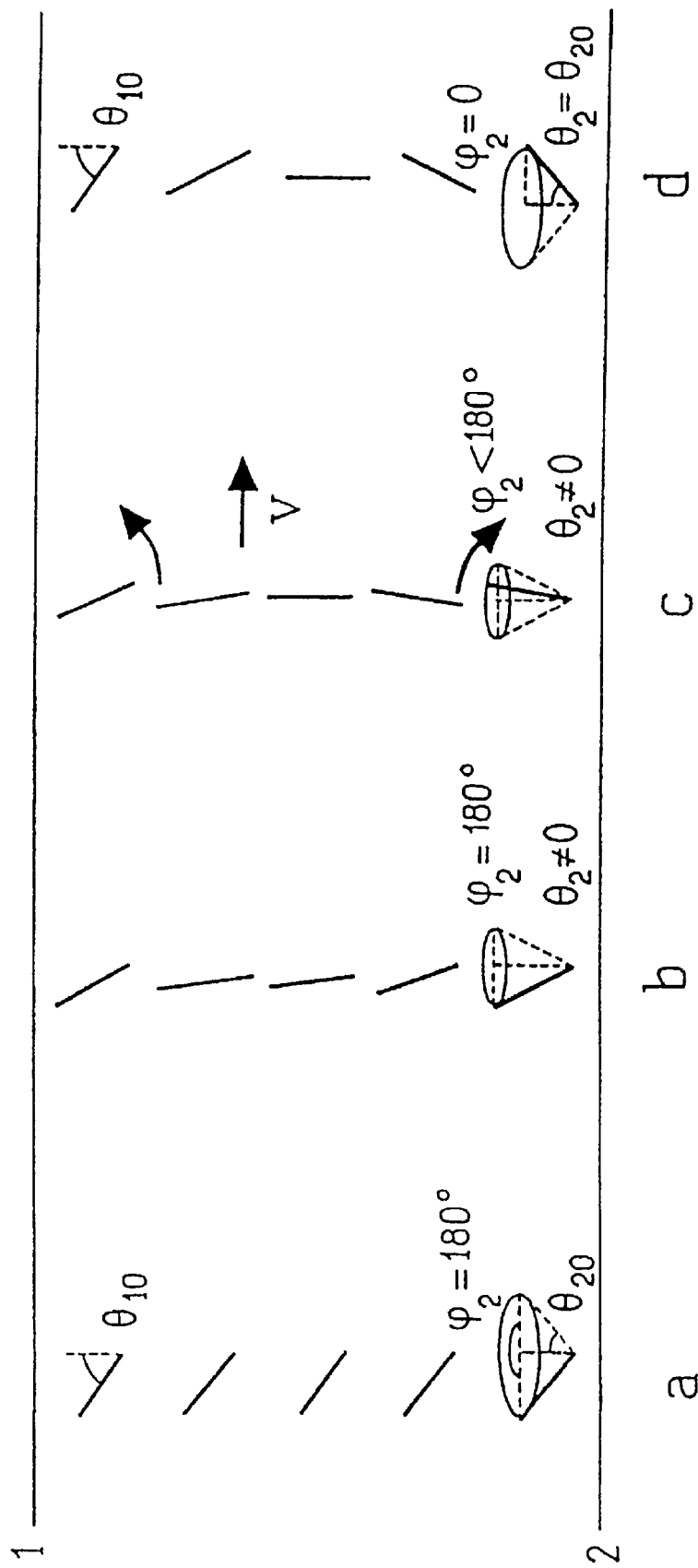
FIG. 8 shows four successive steps of another process in compliance with the present invention, without anchoring being broken.

I.2 c) Switching Without Complete Surface Breaking by Rotating the Director on the Degenerate Anchoring Cone The switching described in FIG. 6 requires zenith anchoring to be completely broken: under an electric field $E>E_{c2}$, the molecules in the vicinity of the plate 2 are aligned to be exactly parallel to the normal thereto. Nevertheless, degenerate anchoring is highly anisotropic: the breaking threshold $E_{c2}$ of zenith anchoring is finite, but azimuth anchoring is infinitely soft and the corresponding breaking threshold is strictly zero (or very low for nearly degenerate anchoring). Such anisotropy makes it easy to switch the texture shown in FIG. 6a to the texture shown in FIG. 6d without passing via the normal to the plate, but by turning the degenerate anchoring cone about its own axis, or by being rotated over a cone that is closer to the normal (FIG. 8). Using an electric field lower than the breaking threshold ($E<E_{c2}$), the molecules on the plate 2 remain at a finite angle relative to the normal FIG. 8b). When the field is switched off, the hydrodynamic flow created by the other plate and the deformed bulk layer, entrain the director towards $\phi=0$. The molecules now turn (FIG. 8c) about the normal (left about or right about, at random), while remaining at substantially the same zenith angle $\theta_2$. Under the superposed action of the flow and of the zenith anchoring (urging towards $\theta_2=\theta_{20}$) the system relaxes towards the texture (8d) that is identical to that of FIGS. 6d and 7d. With degenerate anchoring, only a small resilient twisting torque opposes switching. With nearly degenerate anchoring, a small azimuth anchoring torque is added thereto. Nevertheless, in both cases, switching is much effective than in the event of zenith anchoring being completely broken.

I-3) Experimental results

To study the operation of the proposed device, the inventors have made several cells with degenerate or nearly degenerate anchoring.

A first type of cell uses a plate covered in a fine layer of GLYMO (having a thickness of about 100 Å) on a transparent ITO electrode, providing degenerate planar anchoring of the 5CB nematic. The GLYMO was chemically grafted onto the surface and was cross-linked to form a layer that is stable and insoluble in the liquid crystal. The other plate of the cell was always treated with SiO evaporation (82°, 105 nm, strong anchoring, monostable, $\theta_{10}$ tilt of about 55°). The thickness of the cells lay in the range 1 $\mu$m to 4 $\mu$m.

After being filled, the cells always revealed a plane texture without any twisting. After short electric pulses had been applied, the inventors observed switching to a 180° twisted texture. That texture was transient and spontaneously transformed itself back into the initial texture after an erase time $T_e$. That time was of the order of 10 ms to 100 ms, and it was proportional to the square of the thickness of the cell.

The zenith anchoring energy for those cells was relatively strong, comparable to that obtained with monostable evaporated SiO. Ec was about 10 V/$\mu$m for $\tau=1$ ms. FIG. 9 is a recording of the optical transmission of the cell between cross-polarizers following application of a control pulse 30. On FIG. 9, there are also marked points corresponding to the states explained with reference to FIG. 6. It will be observed that the transmission maximum was obtained for the state 6e. On that cell, in which optical response was not optimized, the inventors measured a contrast of better than 100:1.

Another serges of typical cells was made using plate 2 covered in polyisoprene giving anchoring conical anchoring for 5CB. As backplates 1, the inventors use glass plates with transparent electrodes covered either in rubbed polyimide (anchoring that is strong, planar, and monostable), or else in evaporated SiO (82°, 105 nm, anchoring that is strong, monostable, and tilted at about 55°)

After being filled, all of the samples showed plane textures with the director in the plane defined by the monostable anchoring on the backplate 1. For the backplate 1 that had been treated with SiO (tilted anchoring), a single tilted and nearly uniform texture was observed, similar to the texture of FIG. 6a. For the planar backplate 1 (rubbed polyimide), the two flat textures shown diagrammatically in FIG. 10 coexisted, being separated by faults.

By applying short electric pulses, the inventors observed the cells transiting into the "written" state, twisted at 180°. The write thresholds $E_c$ ($\tau$) measured for the cells are given in FIG. 11. The static threshold for surface breaking was very low with polyisoprene ($E_c$ about 1.5 V/$\mu$m, an order of magnitude smaller than for polyimide). From the practical point of view, this property is very important: the device can be controlled at low voltage, even when using short pulses (U=26 V, for $\tau$ about 10 $\mu$s and a 2 $\mu$m cell). In spite of its low value, the anchoring energy is highly uniform over the surface of the cell, which in practice gives rise to a write threshold that is very well defined and constant over large areas.

FIG. 12 shows the break threshold for 5 CB anchoring as a function of pulse duration for grafted polystyrene treatment on ITO. With this coating also, the threshold is reasonably low (E≈E volts/$\mu$m for $\tau$1 ms) and is highly reproducible. The same threshold was also obtained for almost degenerate anchoring obtained by mechanically rubbing the grafted polystyrene layer.

The time $\tau_e$ is an important characteristic of a monostable display (which erases spontaneously) and it must be adapted depending on the refresh frequency. This time depends on several parameters: cell thickness, anchoring geometry, duration and voltage of control pulse.

In FIG. 13, $\tau_e$ is shown as a function of the square of cell thickness "d" for various samples containing the 5CB nematic. The degenerate anchoring plate 2 was always covered in polyisoprene (degenerate conical anchoring with no memory). Two types of backing plate 1 were used: monostable planar anchoring on rubbed polyimide (curve a) and monostable tilted anchoring on evaporated SiO (curve b). The way in which $\tau_e$ depends on $d^2$ is well known to the person skilled in the art: it can be deduced from the equilibrium condition between the bulk resilient torque in twisting which obliges the director to turn around the anchoring cone, and the opposing viscous torque. It can also be observed that $\tau_e$ is longer for tilted anchoring on the backplate: such cells have a smaller average angle $\theta$ and thus the energies of their bent texture (FIG. 6d) and their twisted texture (FIG. 6e) are very similar. The resilient torque in twisting becomes small and the relaxation time $\tau_e$ lengthens.

FIG. 14 shows the optical response of a cell (5CB, polyisoprene plate 2, tilted SiO backplate 1, thickness 2.3 $\mu$m) for control pulses of fixed duration ($\tau$=50 $\mu$s) and various voltages. More precisely, FIG. 14 shows four curves a, b, c, and d corresponding respectively to four control voltages of 13.4 V, 13.5 V, 14 V, and 15 V. In FIG. 14, it can be seen that beneath a well-defined threshold $U_c$ of about 13.4 volts, no transmission is observed. For U>$U_c$, transmission increases with the voltage applied during the control pulse. For U greater than or equal to US=15 V, transmission intensity saturates at its maximum value and does not change any is further. This dependency, discovered by the inventors, can be explained as follows: at high voltage (U>US), anchoring on the polyisoprene plate is completely broken, and at the end of the pulse, hydrodynamic control is highly effective, causing the director to return quickly to the position $\theta=\theta_0$, $\phi=0°$ (FIG. 6d) assisted by the zenith anchoring. The bent texture achieved in this way is plane and optical transmission is low. At this time, no zenith torque is applied and the anchoring does not slip. As already explained, the texture (FIG. 6d) is unstable and it transforms into the twisted texture of FIG. 6e, which pulls on the surface 2 and causes the anchoring to slip, leading to the final texture of FIG. 6a, after passing through the texture of FIG. 6f. During the transformations following the texture of FIG. 6d and going to the texture of FIG. 6a, the texture is twisted and the transmitted intensity is large.

When the control voltage is small (U about $U_c$), zenith anchoring of the plate 2 is not completely broken, and at the end of the pulse, the director turns about the normal on a small aperture cone $\theta_2<\theta_{20}$. This time the hydrodynamic effect and the zenith anchoring pull on the molecules in two different directions: respectively towards the half-plane $\phi=0°$ and towards the anchoring cone $\theta_2=\theta_{20}$. At the end of the flow, the plane texture of FIG. 6d is not obtained, but instead a twisted texture is obtained as shown in FIG. 6f. This texture untwists quickly and gives rise to the initial texture of FIG. 6a. In addition, all of the intermediate textures are close to the hometrope and as a result the corresponding transmission through cross-polarizers is small.

This model explains the behavior of the curves I(t) in FIG. 14, and in particular the increase in relaxation time and maximum intensity with increasing voltage. Similar curves have been obtained and explained by the inventors, using a fixed control voltage (U=25 volts) and a varying duration $\tau$: for $\tau$=14 $\mu$s there is no optical response; for 14 $\mu$s<$\tau$<16 $\mu$s the transmitted intensity increases progressively; and for $\tau$ greater than or equal to 16 $\mu$s, the optical signal saturates and no longer depends on $\tau$. The way in which the intensity transmitted after the pulse depends on $\tau$ and U is very important from the practical point of view: it makes it possible to use the proposed display in a "gray scale" mode of operation which is of great importance for a color display. This is the ability to change pixel brightness by varying the voltage or the duration of a short control pulse.

In this way, in order to define a gray scale, it is possible to apply pulses that are close to the breaking threshold, e.g. in the form of pulses of fixed duration and of amplitude lying in the range Uc to Uc−20%, or pulses of fixed amplitude and of duration lying in the range $\tau_c$ to $\tau_c$−20% ($\tau_c$ representing the pulse duration required to break anchoring for given amplitude, see FIGS. 11 and 12 for example).

The high fidelity of the thresholds $U_c$ and $\tau_c$ and the rapid rise in luminosity for a small change in these parameters (U or $\tau$) make it possible to have a high multiplexing rate for the display, while retaining gray scale. For example, the display can be written to on a row by row basis with a voltage Urow=$(U_c-U_s)/2$ on the active row and $(U_c-U_s)/2$<Ucol<$(U_s-U_c)/2$ on the columns. In this way, the resulting voltage in the pixels on the active row varies over the range $U_c$ to $U_s$. The brightness of the light transmitted can therefore vary between zero and the maximum value. The voltage on rows that are not addressed remains below the Fredericks instability voltage [10].

To avoid flicker in the image, it is possible to use an image refresh period that is shorter than the erase time $\tau_e$.

Figure 15:
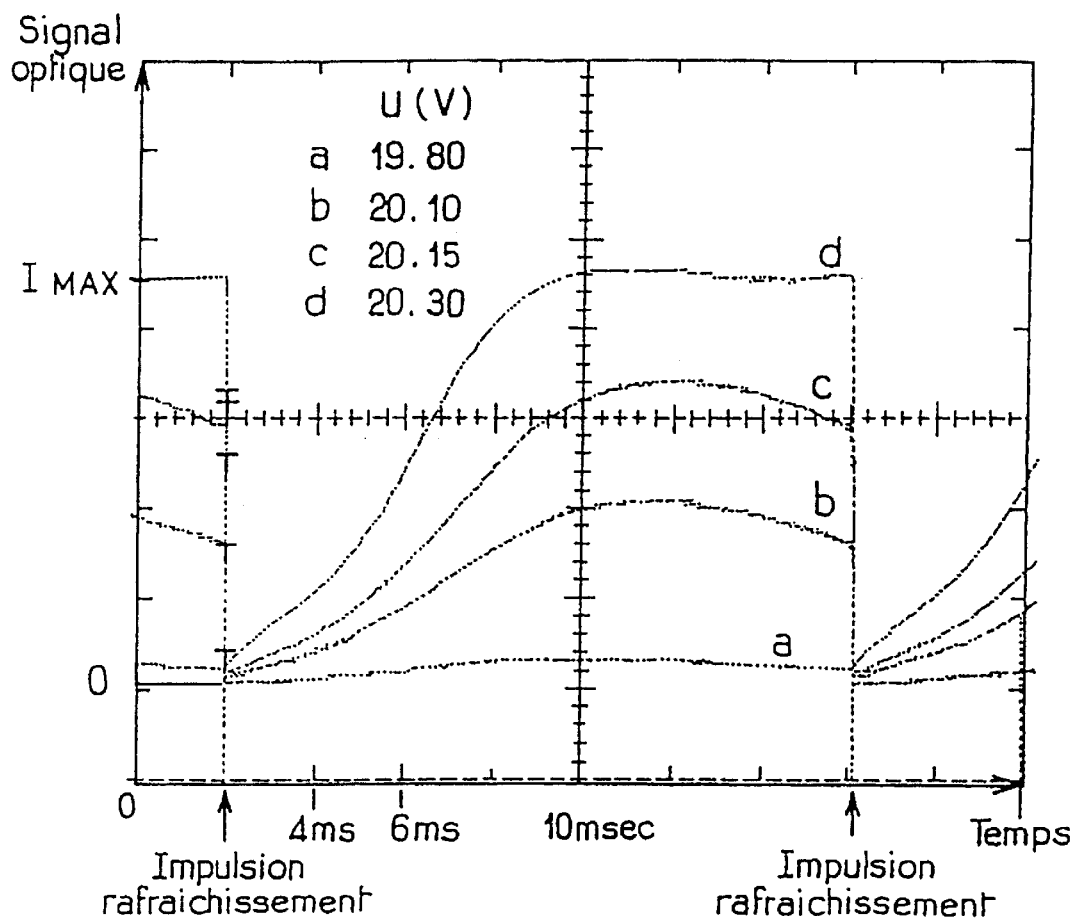
FIG. 15 shows the optical signal as a function of time for refresh pulses at a fixed repetition frequency and for various amplitudes of the pulses.

FIG. 15 shows the optical signal as a function of time for refresh pulses at a fixed repetition frequency and at various pulse amplitudes. In this case, the inventors have shown that the device operates in rms mode: the mean optical signal is a function of the mean of the square of the applied voltage.

FIG. 16 shows the mean light intensity as a function of rms voltage (root-mean-square=square root of the mean of the voltage squared). It can be seen that the voltage threshold is abrupt. The ratio M between the voltage giving a light intensity of 90% and that giving 10% is close to 1.025. This makes it possible to make a screen in which the number of rows is given by the formula of Alt and Pleshko [11]:

$$N=[(M^2+1)/(M^2-1)]2=1600$$

i.e. a screen having 1600 rows.

Finally, the inventors have also studied almost degenerate anchoring obtained by superposing conical or planar degenerate anchoring (polyisoprene, polystyrene, or GLYMO layer) with small monostable alignment (plate rubbed before or after depositing the degenerate anchoring layer, deposition said layer on evaporated SiO, or on some other equivalent anisotropic surface). As already explained, such anchoring constitutes anchoring that is symmetrical, bistable, and having very low azimuth anchoring energy.

In yet another variant, anistropy can be induced by irradiation using a beam of polarized light in the ultraviolet or the visible.

After the control signals have been applied, almost degenerate anchoring breaks and the cell is written to, giving the texture shown in FIG. 6e. The breaking thresholds are the same for the corresponding degenerate anchoring. However, the written texture does not erase spontaneously by the anchoring slipping, and it remains stable on a time scale of seconds. Over longer periods of time, the cell erases by faults moving.

Where appropriate, this spontaneous erasure can be eliminated by adding a chiral doping agent to the liquid crystal material, as proposed in document [9] in another context for monostable anchoring.

Briefly, the display proposed in the context of the present invention presents the following characteristics:

anchoring that is simple to produce;

very fast write times ($\tau$<10 $\mu$s for U about 26 V);

spontaneous erasure after an adjustable time lapse $\tau_e$, of the order of 20 ms to 100 ms, i.e. comparable with video image refresh rates;

gray scale (about 7 to 8 binary grays for a non-optimized cell); and the possibility of obtaining a bistable cell.

It is also possible to envisage the case where the zenith breaking threshold $E_{c2}$ for the degenerate anchoring is greater than the zenith breaking threshold $E_{c1}$ for conventional zenith anchoring. For a field E such that $E_{c2}>E>E_{c1}$, the degenerate anchoring plate becomes the master plate, i.e. it sets up the hydrodynamic bulk and surface flow that give rise to the bent state during writing or elastic interaction which creates the uniform state of FIG. 6a when erasing.

It is also possible to envisage treatment that eliminates all azimuth orientation memory on both plates.

In addition, in the context of the present invention, it is possible to envisage using either a liquid crystal having positive dielectric anisotropy, or a liquid crystal having negative dielectric anisotropy.

II—Devices Using Azimuth torque to Turn Degenerate Anchoring

In the devices described above, the applied field is normal to the plate and the strong electric torque breaks the zenith anchoring of the degenerate azimuth anchoring plate. After the control pulse, a new bulk texture is achieved which, in the monostable case, reverts to the initial texture by azimuth rotation of the molecules on the degenerate anchoring plate.

We describe other devices below, in which azimuth torque applied in the cell produces azimuth rotation. No break in anchoring occurs in this case: the degenerate azimuth anchoring reorients itself freely under such torque and the texture of the cell changes progressively and reversibly since by definition the threshold for breaking degenerate azimuth anchoring is zero. Nevertheless, these novel devices differ from conventional displays by the fact that while switching the orientation of the director turns on the degenerate anchoring plate: instead of the traditional strong anchoring, they use "infinitely weak" azimuth anchoring.

II-1) A Display with Degenerate Anchoring in a Horizontal Field a) Geometry of the Device In this case, both electrodes are disposed on the same plate, e.g. the plate 1 in FIG. 17; they are parallel to the y axis and they are spaced apart by L. The electric field is in the plane of the cell and parallel to the x axis. On the plate 2 there are no electrodes and its anchoring is conical or degenerate planar, without orientation memory. On the plate 1, anchoring is traditional, monostable, planar or tilted with an azimuth angle $\theta_1$ relative to the x axis (FIG. 17). The distance between the plates is d. Without any field, the plane texture of FIG. 17a is achieved: throughout the cell, molecules are parallel to a vertical plane defined by $\phi(z)=\phi_1$. This texture is imposed solely by the anchoring on the plate 1 and by the distortion resilience of the nematic, because there is no surface azimuth torque on the plate 2.

When a voltage U is applied between the two electrodes, the electric field (E=U/L) orients the director n(z) parallel (if $\Delta\epsilon>0$) or perpendicular (if $\Delta\epsilon<0$) to the x axis. On the plate 1, azimuth anchoring is strong and the director does not turn ($\phi(0)=\phi_1$). On the plate 2, azimuth anchoring is free and the edge condition is given by $d\phi/dz|_{z=d}=0$. In general, a twisted texture is obtained in the field, as shown in FIG. 17b, with the molecules on the degenerate plate having an orientation $\phi_2$ that depends on the field. This variation in the orientation of the nematic on the plate 2 with the field distinguishes the device proposed from other devices that are already known and that also make use of horizontal control fields, but in which anchoring on the plate 2 is strong and monostable (homeotropic [documents 12 and 13], planar or tilted [see references cited in document 14]). The person skilled in the art knows that horizontal field displays are much more difficult to make and therefore more expensive than vertical field displays (field normal to the plates); they require control voltages L/d>>1 times greater, the disposition of electrodes in a pixel is complicated, and an active matrix is essential for multiplexing. Nevertheless, horizontal field displays also have a major advantage: their viewing angle is very wide, because the director remains parallel to the plates in all of their states.

b) Comparison Between the Device Proposed and Traditional Anchoring and Horizontal Field Displays To understand the advantages of the device proposed, it is necessary to compare variations of the angle $\phi(z)$ through the cell (FIG. 18) for two very similar displays: the device proposed in FIG. 17a and the same type of display but in which anchoring on the plate 2 is strong and monostable, thereby forcing $\phi(d)=\phi_2=\phi_1$. With no field (U=0), the two displays have uniform texture with $\phi(z)=\phi_1$ (FIG. 18, curve a) To simplify, it is assumed here that $\phi_1=90°$ and $\Delta\epsilon>0$, although the invention is naturally not limited to that case. Up to a certain threshold value for the voltage $U_s$, the surface torque due to the anchoring dominates the bulk electric torque, and the texture remains uniform. For traditional monostable anchoring, the threshold is defined by U's=

$LU_2/d$ where $U_2$ is the Fredericks threshold in twisting geometry [document 10], which is about 0.5 V for 5CB. In our device with conical anchoring on the plate 2, the threshold is half the size $U"s = LU_2/2d$ because of the condition of free anchoring on the plate 2. Above the threshold, the electric torque becomes strong enough to distort the texture. In the case of traditional anchoring on both plates, φ(z) varies within the volume (FIG. 18, curve b), but remains unchanged at the two surfaces. When using degenerate azimuth anchoring on the plate 2, the molecules turn on this surface also (FIG. 18, curve c). In this case, the twisting of the texture is much stronger.

To observe the transformations in the texture, the cell is placed between crossed polarizers, one of which is parallel to the director on the plate 1. For both displays, if $U<U_s$, the cell is a birefringent plate whose slow axis is parallel to the polarization of the incident light, and transmission through the displays (cell plus polarizers) is zero: the display is in its black state.

With the known display, having strong anchoring on both plates, if $U>U_s$, but close to $U_s$, then twisting in the cell corresponds to FIG. 18, curve b, with the Mauguin condition being satisfied $(d\phi/dz<<\Delta n/\lambda)$. Under such circumstances, light polarization follows the direction of the molecules, the effects of high and low twisting cancel, and the display remains black. At higher voltages, cell twisting becomes strong, the Mauguin condition is no longer satisfied close to the surfaces so the light output from the cell becomes strongly elliptical. Transmission increases rapidly with voltage but in different manner for different colors.

With degenerate anchoring, if $U>U_s$ but close to $U_s$, then the cell remains in waveguide conditions and acts as a rotator of polarization: after passing through the cell, the polarization of the light has been turned through an angle $\phi_2-\phi_1$, which is the same (or nearly the same) for all wavelengths. Transmission thus increases very regularly with voltage once the threshold has been passed, and the light that is transmitted remains white.

This continues to be true even in the general case of $\phi_1<90°$ for degenerate anchoring, but under such circumstances there is no clear threshold $U_s$ and twisting of the texture increases progressively with U. Thus, the grays are extended over a greater range of voltages and are therefore easier to control, but contrast is slightly reduced because the total twisting in the cell $\phi_1-\phi_2$ becomes smaller than 90°. To avoid this drawback, it suffices to chiralize the nematic by transforming it into a cholesteric having a long pitch $2 \mu m<P<10 \mu m$. Twisting in a chiralized cell is shown diagrammatically in FIG. 19, curve a, for no field, and curves b, c, and d, for increasing fields.

c) Advantages of the Proposed Display

Certain advantages of the FIG. 17 device over other horizontal field displays become clear from the above description. The degenerate anchoring on the plate 2 makes it possible to reduce the control voltage U by a factor of two, or to use ratios L/d that are twice as great for fixed U, thereby doubling the size of the pixels. The light that is transmitted is white, without any color dispersion. Naturally, the viewing angle is wide, as in all other horizontal field displays. Degenerate anchoring also gives a large degree of freedom in selecting the geometrical parameters of the cell to optimize its behavior. For example, the optics of the cell can be optimized by chiralizing the nematic and by selecting the orientations $\phi_1$ and $\phi_2$ on the two plates independently relative to the field E. It is also possible to control the device by the polarity of the field: since the two surfaces are different, it is possible to create a bulk or surface dipole density in the cell (e.g. flexoelectric [document 13], or ordoelectric [document 15]). This polarization couples with the polarity of the field and depending on its sign the texture is twisted to left or to right, minimizing the energy due to this coupling which is linear in E. This effect can be great when $E \perp n$ or when the field is weak, because in both cases the linear effect is stronger than the dielectric effect (quadratic in E).

d) Experimental Results

The inventors have made several horizontal field cells between a plate 1 having strong planar anchoring (oblique evaporation of SiO) and a plate 2 having degenerate conical anchoring (grafted polystyrene). Both transparent ITO electrodes were deposited on the plate 2 and they were spaced apart by 100 μm. The duration of the control pulses was selected to be 40 ms, which is compatible with the duration of a video image.

Figure 20A:
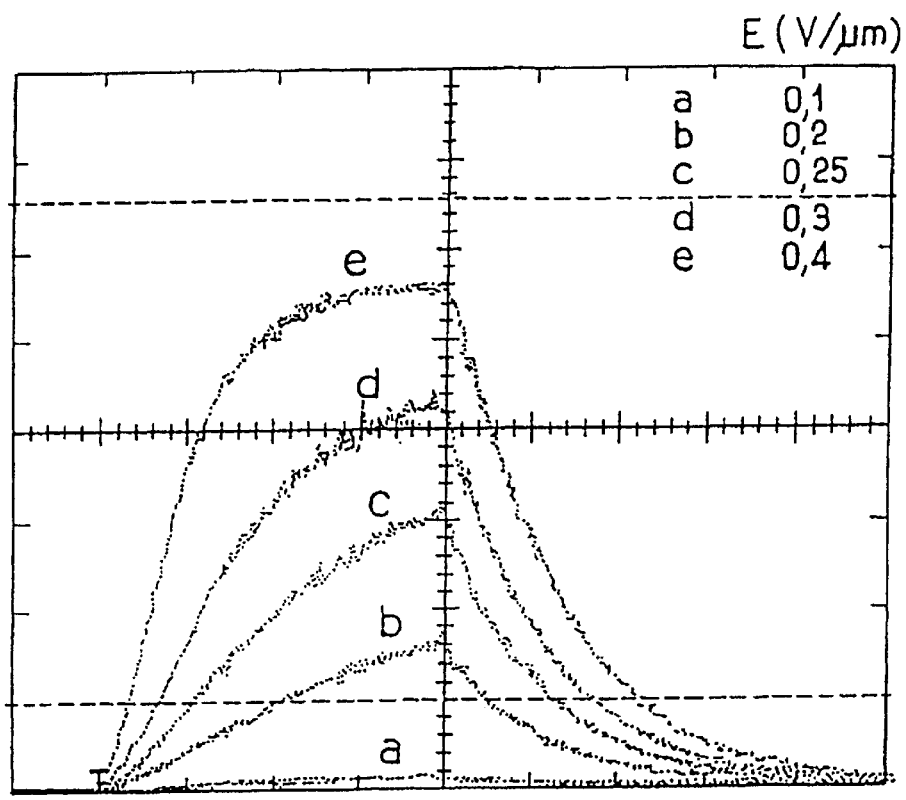
FIG. 20 shows the optical response of a horizontal field cell.
Figure 20B:
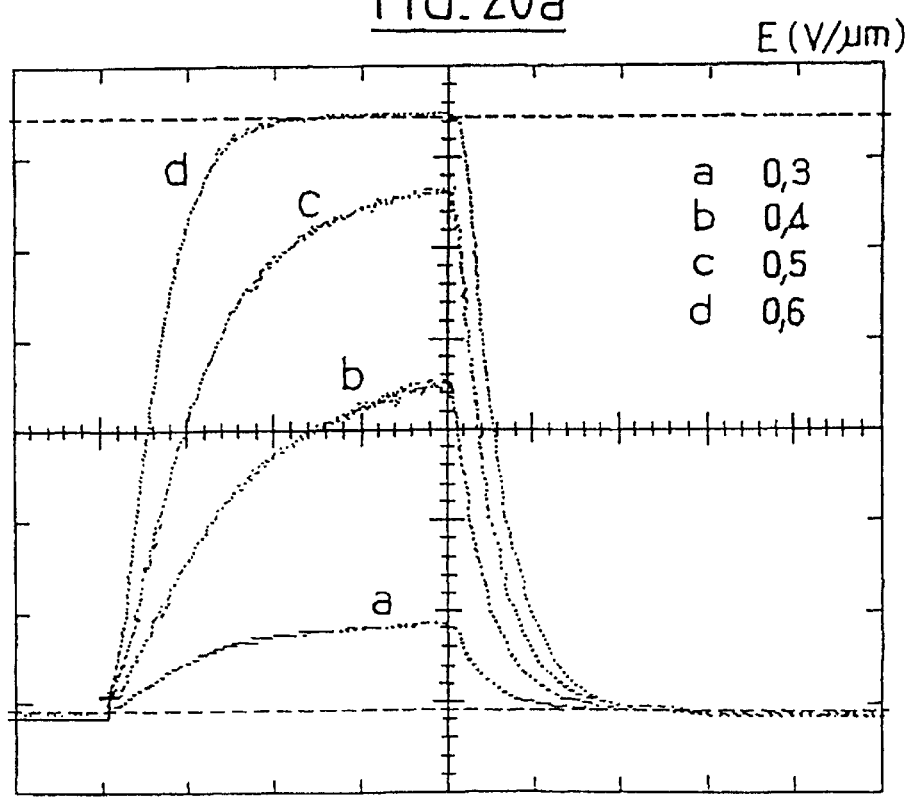

In FIG. 20a, there is shown the optical response of such a cell (d=2.0 μm, $\phi_1=70°$, nematic=pure 5CB) to the variable control field E=U/L. For comparison, FIG. 20b shows the results obtained with a similar cell, but using monostable planar anchoring on the plate 2. In both cases, the contrast was very good (~200) and the viewing angle was large. For monostable anchoring (FIG. 20b) the transmitted light was more colored and the control fields were about two times greater, as expected.

II-2) Display with Degenerate Azimuth Anchoring in a "Vertical" Field

As already explained, the advantage of devices using horizontal fields is their wide viewing angle. In contrast, the advantage of displays having a "vertical" field (perpendicular to the plates, obtained between two transparent electrodes deposited on the two plates) is their simplicity and their low control voltage. It is shown below that by using conical anchoring it is possible to combine the advantages of both types of display.

a) Geometry of the Device

In this case (FIG. 21) the two electrodes are deposited respectively on the two plates 1 and 2. The electric field E=U/d is parallel to the normal to the plates. Anchoring on the plate 1 is monostable (planar or tilted). On plate 2, anchoring is degenerate, being planar or conical, and it has no memory. The liquid crystal between the plates is a chiralized or cholesteric nematic having a pitch P that is relatively large compared with the wavelength of visible light. The conical or planar degenerate anchoring on the plate 2 distinguishes the proposed device from homeotropic monostable anchoring devices that have already been proposed in documents [16] and [17].

The person skilled in the art knows that without external constraint, imposed by a field or by edges, the cholesteric winds into a helix. If the axis of the helix is parallel to z, the molecules are perpendicular to said axis (θ=90°) and $\phi=\phi(z)=q_0 z$, where $q_0=2\pi/P$ is the wave vector of the spontaneous cholesteric twisting. Anchoring conditions in the cell of FIG. 21 require a helical texture with the axis of the helix being perpendicular to the plates. Nevertheless, the alignments on the plates and the applied electric field impose a zenith angle θ=θ(z) which is generally not equal to 90°. Coupling then appears between θ(z) and dφ(z)/dz due to the anisotropy of the elastic constants of the nematic $(K_1 \approx K_3 > K_2)$. Assuming that $K_1=K_3=K>K_2$, and when azimuth anchoring is free on one of the plates, the following relationship applies:

$$\frac{d\varphi}{dz} = q_0 \Big/ \Big[1 + \Big[\frac{K}{K_2} - 1\Big]\cos^2\theta\Big]$$

in which relationship:
  $K_1$ is the elastic constant for fan deformation of the liquid crystal;
  $K_2$=the elastic constant for twisting;
  $K_3$=the elastic constant for bending.

Coupling then exists between zenith. distortion and azimuth distortion. If the structure is close to being planar ($\theta \approx 90°$, FIG. 21a) then the system returns to $d\phi/dz=q_0$. If the texture is close to being homeotropic ($\theta<<90°$) then a reduction in twisting is obtained $d\phi/dz=q_0K_2/K$.

In the device proposed by the inventors, the coupling between $\phi$ and $\theta$ acts as a torque "converter". It transforms zenith torque created directly by the vertical field into azimuth torque. Thus, because of the free azimuth anchoring on the plate 2, the angle $\phi_2$ changes under the action of the field (FIG. 21b, assuming in this Figure that $\Delta\epsilon >0$). Between crossed polarizers, a change is obtained in the transmitted intensity. If P and $\Delta n$ are large, the texture is nearly planar, and the system operates under waveguide conditions, so that at the outlet from the cell, polarization is rotated to a greater or lesser extent depending on the applied field. Such conditions are easily achieved with tilted anchoring on both plates and $\Delta\epsilon<0(\theta<90°$ for no field, $\theta \approx 90°$ under a field). If P is small and/or the texture is close to homeotropic ($\theta<<90°$), waveguide conditions are disturbed and light at the outlet from the cell is elliptical to a greater or lesser extent depending on the field. These conditions are easily achieved with planar anchoring (or anchoring close to planar) on both plates and $\Delta\epsilon>0$(texture almost homeotropic under a field).

b) Advantages of the Proposed Device

The proposed device presents numerous advantages compared with devices based on traditional anchoring. Compared with horizontal field displays, these advantages are as follows:
  a simplicity of implementation;
  possibility of making pixels of arbitrary size and shape;
  small control voltages, with the option of operating under passive conditions (no active matrix); and
  good colorimetry when operating in waveguide mode.

Compared with vertical field displays with traditional anchoring, these advantages are as follows:
  wide viewing angle;
  good colometry when operating in waveguide mode; and
  the possibility of strong changes of texture and thus of $\phi$ without faults appearing (these variations can thus be very fast and reversible).

c) Experimental Results

To demonstrate the performance of the device proposed for a vertical field, the inventors have made various cells between two glass plates, using transparent ITO electrodes on the inside surfaces of the plates. In all cases anchoring was traditional and monostable on plate 1 and degenerate planar or conical on plate 2. The nematic was 5CB and it was chiralized to obtain spontaneous twisting at a pitch P that is much greater than the wavelength.

FIG. 22 shows the optical response of such a cell to an electrical pulse of duration $\tau=40$ ms (compatible with video frequency) and a voltage U lying in the range 1.0 V to 3.0 V. The anchoring was monostable and tilted (Sio) on the plate 1 and degenerate and conical (grafted polystyrene) on the plate 2. The thickness of the cell was d=4.0 $\mu$m and the cholesteric pitch was P$\approx$5.0 $\mu$m. Twisting in the cell varied over the range ~270° with no field and $\approx$160° under a strong field. This strong twisting ensured a wide viewing angle compatible to that of supertwisted displays. Response times were compatible with video image frequency and contrast (not optimized) was about 20.

Figure 23:
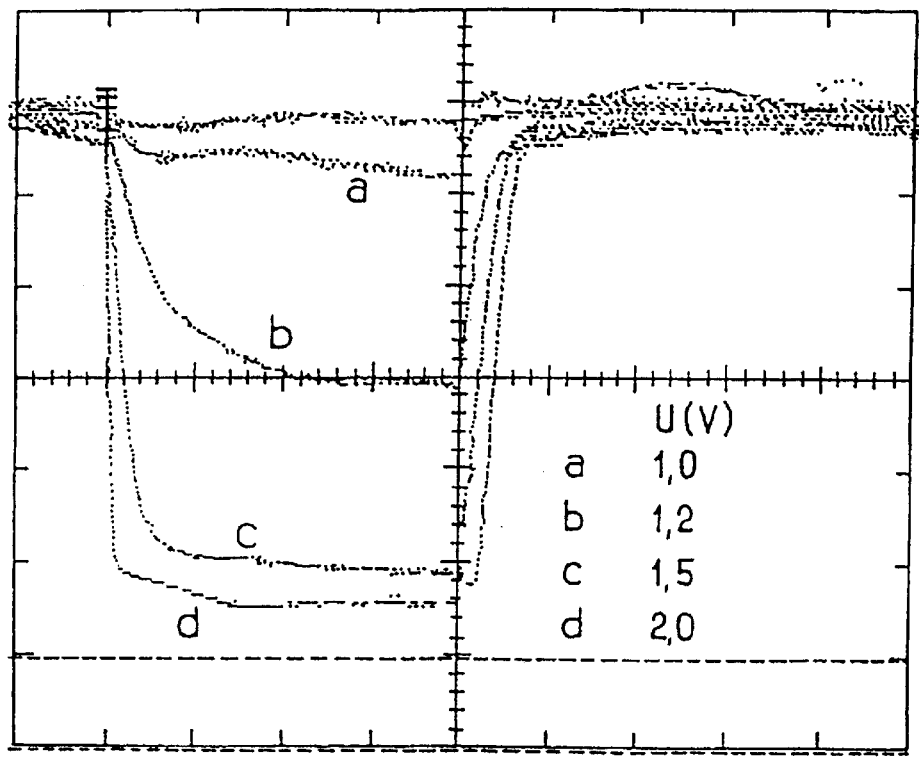
FIG. 23 shows the optical response for a similar device of different thickness and different pitch.

FIG. 23 shows the optical response of another cell using the same anchoring, but with d=2.9 $\mu$m and P$\approx$2.6 $\mu$m. Because of the smaller thickness, relaxation times were faster in that cell, enabling the image to be refreshed more frequently (e.g. 16.6 ms for the NTSC standard). Cell contrast was very good, being about 140.

In both cells, the helical pitch was not large enough to satisfy the Mauguin condition $\Delta nP >>\lambda$. Waveguide conditions were therefore disturbed and color dispersion was not fully avoided. Also, the inventors observed strong total twisting in the cells of texture modulation, as already observed in hybrid cells [document 17]. Such continuous modulation, without fault line, is due to the conical anchoring on the plate 2, and for small thicknesses (d$\approx$P) it replaces the genuine fault ("fingerprints") observed in cholesterics with monostable anchoring. The response times in the present case were not influenced by texture modulation: there was no hysteresis since faults are neither created nor transported.

Modulation was observed in the no field state, which is the clear state for the proposed display, and it did not degrade contrast.

Figure 24:
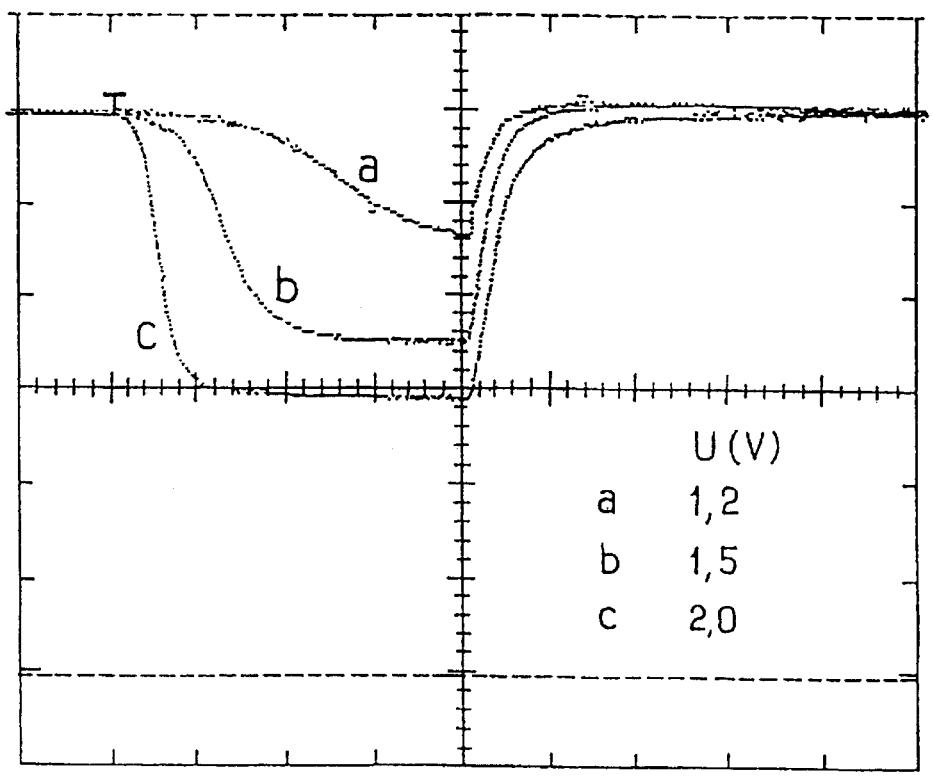
FIG. 24 shows the optical response of a long pitch cell.

FIG. 24 shows the optical response of a long pitch cell (P$\approx$13 $\mu$m) operating under waveguide conditions and providing better colorimetry. The thickness of that cell was d$\approx$3.7 $\mu$m, monostable planar anchoring (Sio) on plate 1 and degenerate planar anchoring (typically using GLYMO) on plate 2. Total distortion of the cell was small and there was no texture modulation.

BIBLIOGRAPHY

1. J. Cognard, "Alignment of nematic liquid crystals and their mixtures", Mol. Cryst. Liq. Cryst. Suppl. 1, pp. 1–77 (1982).
2. Durand et al., U.S. Pat. No. 5,357,358.
3. R. Barberi, G. Durand, Appl. Phys. Lett. 58, 2907 (1991).
4. R. Barberi, M. Giocondo, Ph. Martinot-Lagarde, G. Durand, J. Appl. Phys. 62, 3270 (1993).
5. R. Barberi, M. Giocondo, G. Durand, Appl. Phys. Lett. 60, 1085 (1992).
6. B. Jerome, "Surface effects and anchoring in liquid crystals", Rep. Prog. Phys. 54, 391 (1991).
7. S. Matsumoto, M. Kawamoto, N. Kaneko, "Surface-induced molecular orientation of liquid crystals by carboxylato-chromium complexes", Appl. Phys. Lett. 27, 268 (1975).
8. Parent application PCT/FR 96/01771 dated Nov. 8, 1996.
9. I. Dozov, M. Nobili, G. Durand, "Fast bistable nematic display using monostable surface switching", Applied Physics Letters 70, p. 1179 (1997).
10. P. G. de Gennes, J. Prost, "The physics of liquid crystals", Clarendon Press, Oxford, 1993.
11. Alt. P. M. and Pleshko P.; 1974 IEEE Trans. Elec. Dev. ED-21:146.
12. French patent FR 82/07309 to G. Durand, Ph. Martinot-Lagarde, I. Dozov, entitled "Perfectionnement aux cellules optiques utilisant les cristaux liquides" [Improved optical cells using liquid crystals].
13. I. Dozov, Ph. Martinot-Lagarde, G. Durand, "Flexo-electrically controlled twist of texture in a nematic liquid crystal", J. Phys. Lett. 43, 366–369 (1982).

14. MASAHITO OH-E et al. "Dependence of viewing angle characteristics on pretilt angle in the in-plane switching mode liquid crystals", 1997, Vol. 22, No. 4.
15. G. Durand, "Order electricity in liquid crystals", Physica A., 163, 94–100 (1990).
16. U.S. Pat. No. 4,114,990.
17. I. Dozov, I. Penchev, "Structure of a hybrid aligned cholesteric liquid crystal cell", J. Physique 47 (1986).

What is claimed is:

1. A liquid crystal display device comprising a liquid crystal material sandwiched between two confinements (1,2), the device being characterized by the fact that at least one of the plates (2) is provided with treatment which defines degenerate azimuth anchoring so that no azimuth direction is imposed by anchoring to the liquid crystal material and furthermore the liquid crystal molecules are free to turn around a normal to the plates, without azimuth orientation memory so that an external electric or magnetic field does not generate any azimuth orientation memory.

2. A device according to claim 1, characterized by the fact that the treatment comprises passivating a surface of at least one of the plates (1,2) by inhibiting adsorption sites on said surface.

3. A device according to claim 1 or 2, characterized by the fact that the treatment is obtained by selecting a material constituting the confinement plates or by selecting a covering thereon.

4. A device according to claim 3, characterized by the fact that the material comprises a polymer having chains that are fluid or highly mobile or that do not include any adsorption sites for the liquid crystal.

5. A device according to claim 1, characterized by the fact that the treatment includes grafting a coating.

6. A device according to claim 1 characterized by the fact that the treatment operates by saturating adsorption sites.

7. A device according to claim 1 characterized by the fact that the treatment is adapted to avoid strongly interacting with the liquid crystal, in particular to avoid being easily orientated by anisotropic interactions with the mesogenic molecules of the liquid crystal.

8. A device according to claim 1 characterized by the fact that the treatment comprises a compound selected from organofunctional silanes.

9. A device according to claim 1 characterized by the fact that the treatment comprises a compound selected from the family of organofunctional silanes including chlorosilane groups (Si—Cl), silanol (Si—OH), or alkoxysilane (Si—$C_nH_{2n}$OH).

10. A device according to claim 1 characterized by the fact that the treatment comprises chromium complexes.

11. A device according to claim 1 characterized by the fact that the treatment is constituted by 3-glyceryloxypropyl trimethoxysilane (GLYMO).

12. A device according to claim 4, characterized by the fact that the material comprises polymers in liquid phase throughout a thermal stability range of a mesogenic phase used, and by the fact that said polymers are grafted onto a surface of at least a plate.

13. a device according to claim 4, characterized by the fact that the material comprises polymers that are insoluble in the liquid crystal, in their vitreous state.

14. A device according to claim 4 characterized by the fact that the material comprises siloxane polymers that are liquid or polymers that are vitreous at ambient temperature.

15. A device according to claim 14, characterized by the fact that the material comprises polyisoprene, polybutadiene, or polystyrene.

16. A device according to claim 1 characterized by the fact that the treatment is adapted to define degenerate planar anchoring.

17. A device according to claim 1 characterized by the fact that the treatment is adapted to define degenerate conical anchoring.

18. A device according to claim 1 characterized by the fact that it comprises means suitable for controlling a change of state by a surface hydrodynamic effect.

19. A device according to claim 1 characterized by the fact that it comprises means suitable for controlling a change of state by a bulk hydrodynamic effect.

20. A device according to claim 1 characterized by the fact that it comprises control means applying a pulse to the liquid crystal that is lower than a breaking threshold on the plate provided with the treatment.

21. A device according to claim 20, characterized by the fact that it comprises control means creating a bulk or surface hydrodynamic effect inducing azimuth rotation of anchoring that is degenerate or nearly degenerate without breaking the zenith anchoring.

22. A device according to claim 1 characterized by the fact that it comprises control means applying a pulse to the liquid crystal that is greater than the breaking threshold on the plate provided with the treatment.

23. A device according to claim 1 characterized by the fact that the treatment is deposited on an isotropic substrate to define anchoring that is degenerate, conical or plane without orientation hysteresis.

24. A device according to claim 1 characterized by the fact that the treatment is deposited on an anisotropic substrate.

25. A device according to claim 24, characterized by the fact that the treatment is deposited on a layer of SiO placed on a confinement plate.

26. A device according to claim 1 characterized by the fact that it comprises means superposing anisotropy on conical or planar degenerate anchoring to produce anchoring that is nearly degenerate having non-zero azimuth energy but no memory or hysteresis.

27. A device according to claim 26, characterized by the fact that the means suitable for superposing anisotropy on conical or planar degenerate anchoring are selected from the group comprising: rubbing the confinement plate (2) before or after depositing the coating; depositing the coating on an anisotropic surface; or inducing anisotropy by irradiating a passivation coating using a beam of polarized light in ultraviolet or in visible range.

28. A device according to claim 1 characterized by the fact that the display device is bistable and that in the absence of a field at least two textures among the three possible textures are stable:

plane/tilted (FIGS. 6a, 7a), plane/bent (FIGS. 6d, 7d), and twisted texture (FIG. 6f).

29. A device according to claim 28, characterized by the fact that the tilts ($\theta$) of the molecules at rest relative to a normal to the confinement plates are small enough to stabilize the plane/bent texture.

30. A device according to claim 28 characterized by the fact that it includes a chiral doping agent to stabilize the twisted texture.

31. A device according to claim 1 characterized by the fact that the display device is monostable, that the state induced by the control means is unstable, and that the device returns spontaneously to its initial stable state by a continuous path.

32. A device according to claim 31, characterized by the fact that the tilts ($\theta$) of the molecules at rest relative to a normal to the confinement plates are large.

33. A device according to claim 20, characterized by the fact that the control means are adapted to apply selectively to the liquid crystal a pulse selected from a plurality of control pulses close to the breaking threshold to define selected gray levels.

34. A device according to claim 33, characterized by the fact that the control pulses are of fixed duration and of amplitude that is variable close to the breaking threshold.

35. A device according to claim 33, characterized by the fact that the control pulses are of fixed amplitude and of duration that is variable close to the breaking threshold.

36. A device according to claim 33 characterized by the fact that it is organized as a matrix and that the control means are adapted to apply a voltage $Urow=(U_c+U_s)/S$ to the active row and $(U_c-U_s)/2<Ucol<(U_s-U_c)/2$ to the columns, $U_c$ and $U_s$ representing respectively the thresholds at which a change of state in the device appears and saturates.

37. A device according to claim 28, characterized by the fact that to erase a written texture, the control means apply a pulse which favors elastic interaction between the two surfaces relative to their hydrodynamic interaction.

38. A device according to claim 33 characterized by the fact that the repetition period of the control pulses which refresh the image is less than the erase time of the device, and that gray level selection is thus given by the root means square value of the voltage applied to the pixel.

39. A device according to claim 1 and 38, characterized by the fact that control means are provided suitable for breaking anchoring on both plates.

40. A device according to claim 39, characterized by the fact that complementary control means are provided suitable for creating an orientation horizontal flow or field.

41. A device according to claim 1 characterized by the fact that the zenith breaking threshold of the degenerate anchoring provided on one plate is higher than the zenith breaking threshold of conventional anchoring provided on the other plate, and means are provided that are suitable for applying a field lying between the two anchoring thresholds defined in this way.

42. A device according to claim 1 characterized by the fact that both plates (1,2) are treated to define degenerate azimuth anchoring without azimuth orientation memory.

43. A device according to claim 1 characterized by the fact that one of the plates induces strong azimuth anchoring and the other induces planar or conical degenerate azimuth anchoring.

44. A device according to claim 43, characterized by the fact that it comprises means suitable for applying an electric field perpendicular to the plates and that the liquid crystal is cholesterized to form a regular helical texture in the cell at a pitch which changes under the action of the field because of the degenerate azimuth anchoring of one of the plates.

45. A device according to claim 44, characterized by the fact that the liquid crystal is of positive anisotropy and that under the field the regular helical texture is conserved, but its pitch varies.

46. A device according to claim 44, characterized by the fact that the liquid crystal has negative anisotropy and that at least one of the anchoring on the plates is tilted; such that the applied field increases the zenith angle and changes the helical pitch.

47. A device according to claim 43, characterized by the fact that it comprises means suitable for applying an electric parallel to the plates to control twisting of the molecules in the vicinity of the plate having degenerate azimuth anchoring.

48. A device according to claim 47, characterized by the fact that the liquid crystal is nematic with positive dielectric anisotropy and that the field E is applied perpendicularly to the uniform texture of the nematic when there is no field.

49. A device according to claim 47, characterized by the fact that the liquid crystal is nematic with negative anisotropy and that the field E is applied parallel to the uniform texture of the nematic when there is no field.

50. A device according to claim 47, characterized by the fact that the liquid crystal is nematic and that the field is applied in a direction other than zero and 90° relative to the uniform texture.

51. A device according to claim 47, characterized by the fact that the liquid crystal is cholesterized to obtain a texture that is helical in the absence of the field.

* * * * *